US012326687B2

(12) United States Patent
Takeuchi et al.

(10) Patent No.: US 12,326,687 B2
(45) Date of Patent: Jun. 10, 2025

(54) IMAGE FORMING APPARATUS

(71) Applicant: BROTHER KOGYO KABUSHIKI KAISHA, Nagoya (JP)

(72) Inventors: Kimio Takeuchi, Nagoya (JP); Shinichi Hatakeyama, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 18/466,959

(22) Filed: Sep. 14, 2023

(65) Prior Publication Data

US 2024/0103435 A1 Mar. 28, 2024

(30) Foreign Application Priority Data

Sep. 26, 2022 (JP) ................................ 2022-152960

(51) Int. Cl.
*G03G 15/20* (2006.01)
*G03G 21/20* (2006.01)

(52) U.S. Cl.
CPC ....... *G03G 21/206* (2013.01); *G03G 15/2017* (2013.01)

(58) Field of Classification Search
CPC ........... G03G 15/2017; G03G 15/2028; G03G 15/2053; G03G 2215/2003
See application file for complete search history.

(56) References Cited

U.S. PATENT DOCUMENTS

| | | | | |
|---|---|---|---|---|
| 5,528,345 | A | 6/1996 | Hasegawa | |
| 2002/0057920 | A1* | 5/2002 | Yano .................... | G03G 21/206 399/92 |
| 2015/0192883 | A1 | 7/2015 | Suzuki et al. | |

FOREIGN PATENT DOCUMENTS

| | | | |
|---|---|---|---|
| JP | 8-6414 | A | 1/1996 |
| JP | 2015-129834 | A | 7/2015 |
| JP | 2019035868 | A * | 3/2019 |

* cited by examiner

*Primary Examiner* — Thomas S Giampaolo, II
(74) *Attorney, Agent, or Firm* — Merchant & Gould P.C.

(57) ABSTRACT

An image forming apparatus includes a photosensitive drum and a fuser. The fuser includes an upper frame. The upper frame includes an upper first rib downstream of a heating rotating member in a sheet conveying direction, an upper second rib adjacent to the upper first rib in a width direction perpendicular to the sheet conveying direction, and first and second conveying rollers. The upper first rib includes a first guide surface, and a separation surface. The upper second rib includes a second guide surface. The second guide surface is located downstream of the first guide surface in the sheet conveying direction. A distance between a nip point between the first and second conveying rollers and the second guide surface in a direction perpendicular to the sheet conveying direction and the width direction is smaller than a distance between the nip point and the separation surface.

12 Claims, 21 Drawing Sheets

FIG. 14A
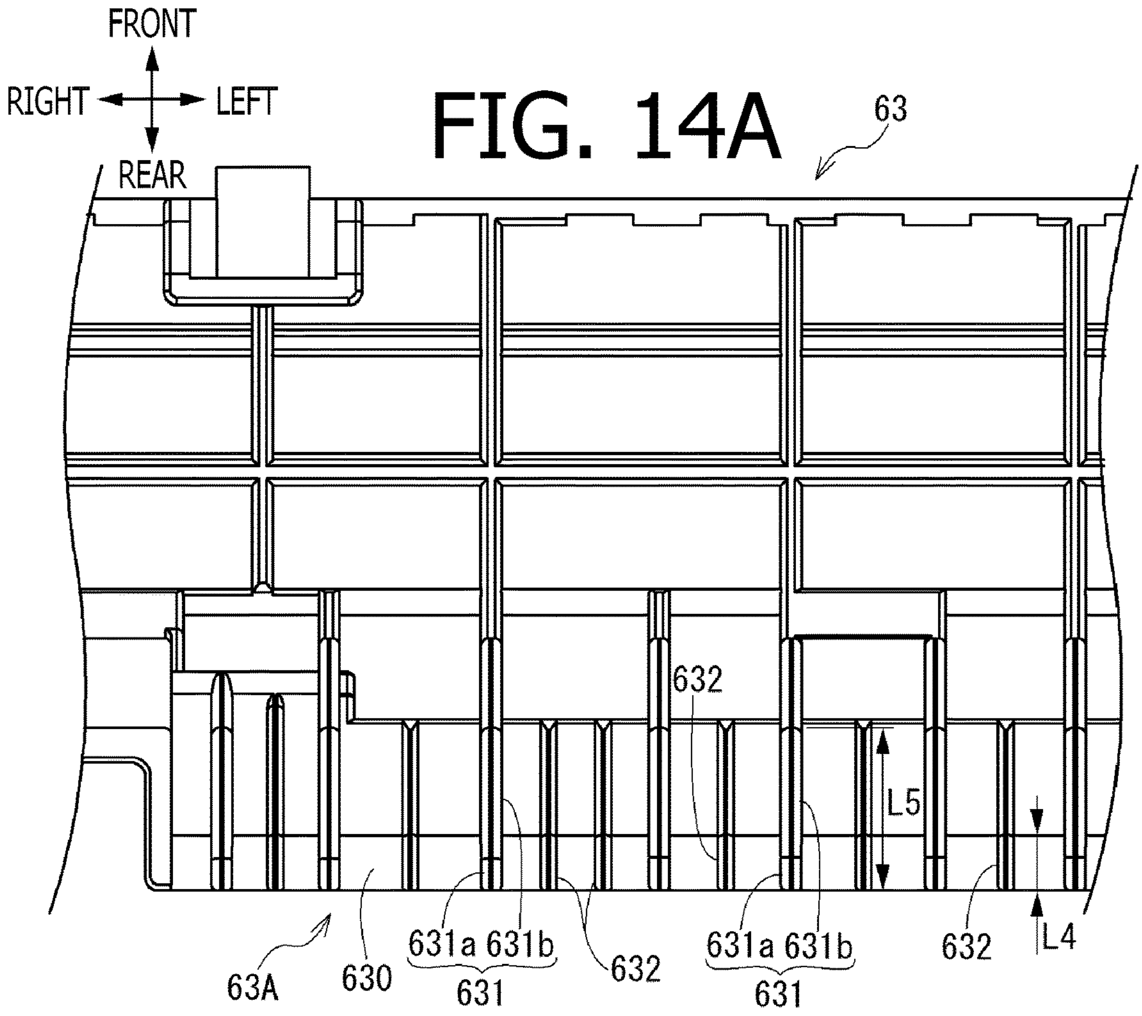
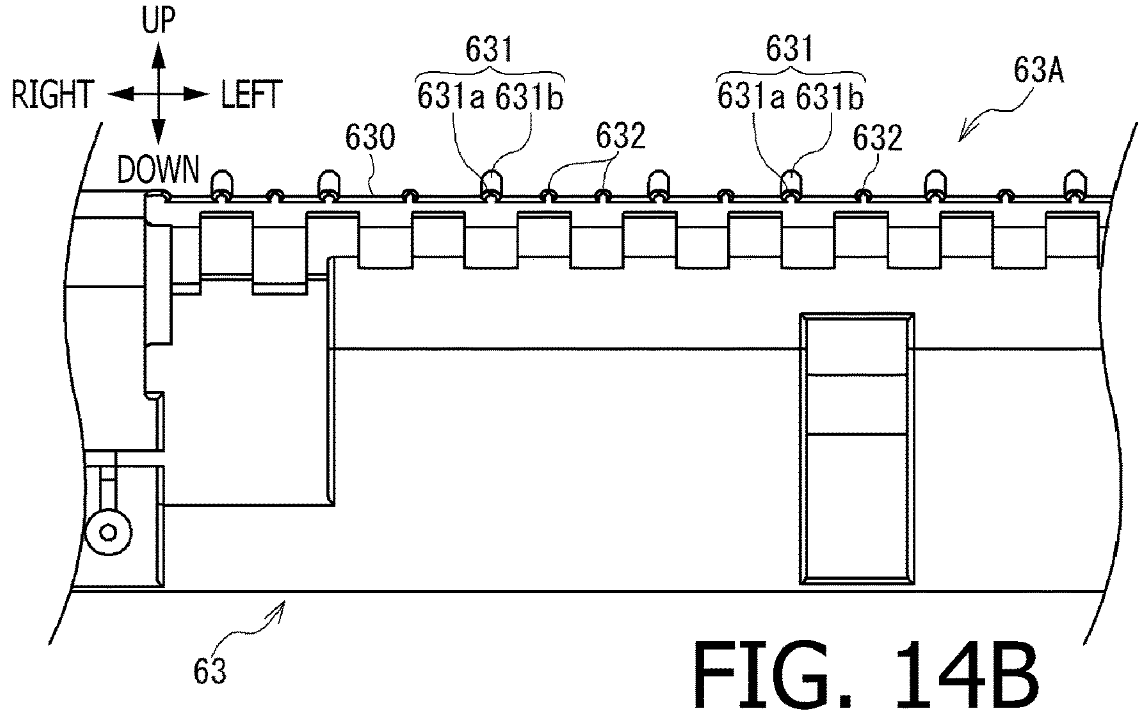
FIG. 14B

IMAGE FORMING APPARATUS

REFERENCE TO RELATED APPLICATIONS

This application claims priority from Japanese Patent Application No. 2022-152960 filed on Sep. 26, 2022. The entire content of the priority application is incorporated herein by reference.

BACKGROUND ART

Aspects of the present disclosure relate to an image forming apparatus.

Conventionally, there has been known an image forming apparatus including a fuser configured to thermally fix a toner image transferred from a photosensitive drum to a sheet.

The fuser includes a frame to which ribs for guiding a sheet to be conveyed are formed. When the toner image transferred to the sheet is thermally fixed with the fuser, water vapor is generated from the heated sheet, and water droplets adhere to the ribs of the frame due to the water vapor.

DESCRIPTION

When executing duplex printing on a sheet with the image forming apparatus, the sheet passing through the fuser during printing on one side of the sheet wipes off water droplets adhered to the ribs, and when the sheet after the printing on one side is re-conveyed to the photosensitive drum, the water droplets wiped by the sheet may transfer to the photosensitive drum.

When the water droplets adhere to the photosensitive drum, surface potential of the photosensitive drum decreases. Therefore, toner may adhere even to portions of the photosensitive drum that are not exposed and stain may occur on the sheet.

At least one aspect of the present disclosure is advantageous to provide an image forming apparatus capable of reducing the amount of water adhering to a sheet and suppressing the occurrence of stain on the sheet.

According to aspects of the present disclosure, there is provided an image forming apparatus including a photosensitive drum on which a toner image is to be formed, and a fuser configured to fix the toner image transferred from the photosensitive drum onto a conveyed sheet. The fuser includes a heating rotating member, a pressing rotating member configured to nip the sheet together with the heating rotating member, and an upper frame covering the heating rotating member. The upper frame includes an upper first rib extending in the sheet conveying direction downstream of the heating rotating member in the sheet conveying direction, an upper second rib adjacent to the upper first rib in a width direction perpendicular to the sheet conveying direction and extending in the sheet conveying direction, a first conveying roller configured to convey the sheet, and a second conveying roller configured to face the first conveying roller, the first conveying roller and the second conveying roller configured to nip the sheet at a nip point therebetween. The upper first rib includes a first guide surface configured to guide an upper surface of the conveyed sheet, and a separation surface located downstream of the first guide surface in the sheet conveying direction and at a position farther from the nip point than the first guide surface in a direction perpendicular to the sheet conveying direction and the width direction. The upper second rib includes a second guide surface configured to guide the upper surface of the conveyed sheet. The second guide surface is located downstream of the first guide surface in the sheet conveying direction. A distance between the nip point and the second guide surface in the direction perpendicular to the sheet conveying direction and the width direction is smaller than a distance between the nip point and the separation surface.

FIG. 14A is a plan view of the lower frame.

FIG. 14B is a rear view of the lower frame.

Hereinafter, embodiments according to aspects of the present disclosure will be described with reference to the accompanying drawings.

Image Forming Apparatus

Figure 1:
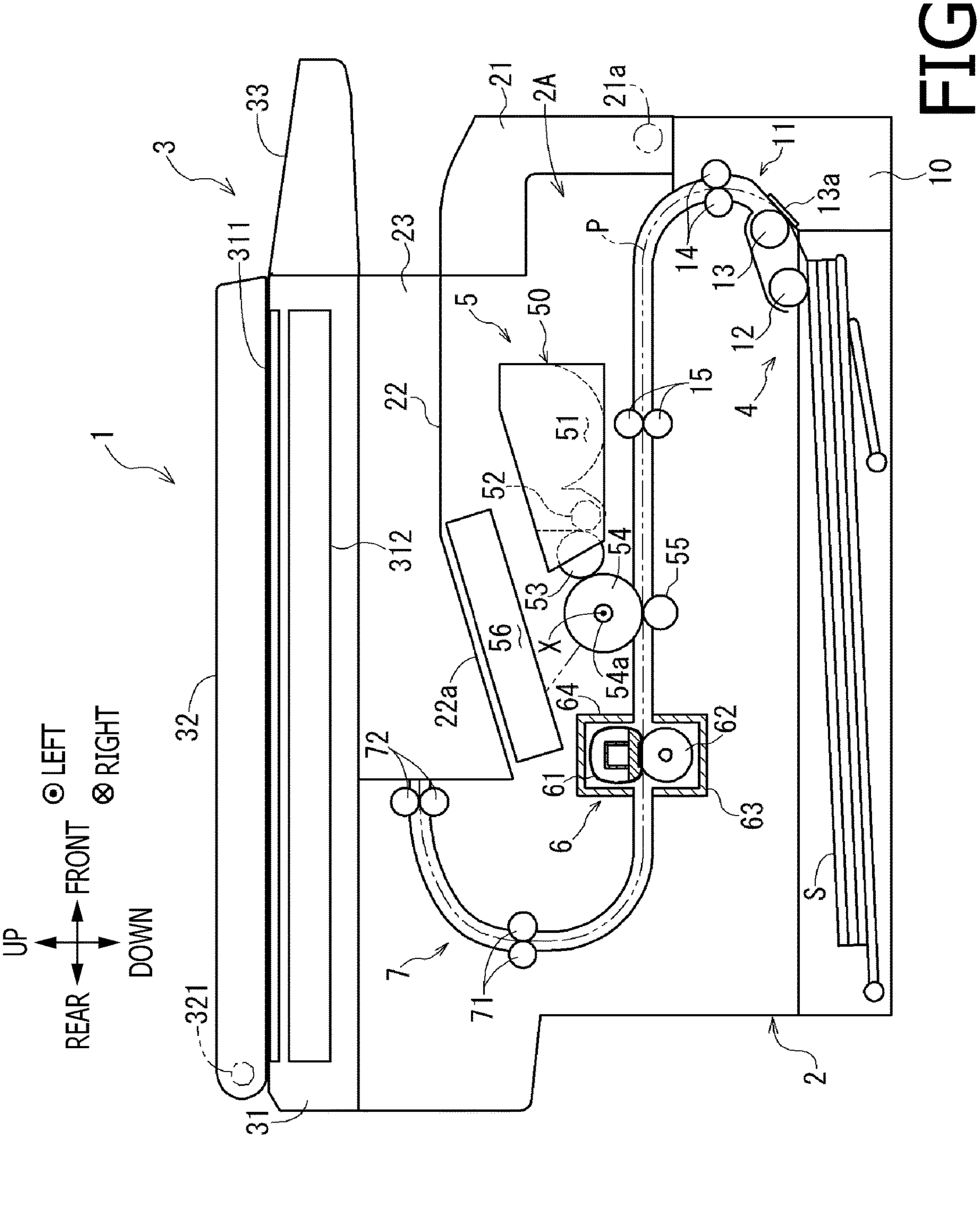
FIG. 1 is a central cross-sectional view of an image forming apparatus.

An image forming apparatus 1 shown in FIG. 1 is an illustrative embodiment of an image forming apparatus including a sheet conveyer according to aspects of the present disclosure. The image forming apparatus 1 is a laser printer configured to form an image on a sheet S by an electrophotographic method.

In the following description, the right side in FIG. 1 is defined as the front side of the image forming apparatus 1, the left side in FIG. 1 is defined as the rear side of the image forming apparatus 1, the near side in FIG. 1 is defined as the left side of the image forming apparatus 1, the far side in FIG. 1 is defined as the right side of the image forming apparatus 1, the upper side in FIG. 1 is defined as the top side of the image forming apparatus 1, and the lower side in FIG. 1 is defined as the bottom side of the image forming apparatus 1.

The image forming apparatus 1 includes a first housing 2 and a second housing 3.

The first housing 2 is formed in a substantially rectangular parallelepiped shape with an opening 2A on a front surface thereof. The first housing 2 includes a front cover 21 configured to open and close the opening 2A. The front cover 21 is configured to pivot about a pivot axis 21*a* at a lower end portion thereof, and is movable between a closed position for closing the opening 2A and an open position for opening the opening 2A by pivoting about the pivot axis 21*a*. An upper surface 22 of the first housing 2 is formed with a sheet discharge tray 22*a* that is inclined downward from the front side toward the rear side.

The first housing 2 accommodates a sheet feed tray 10 configured to support one or more sheets S, a sheet conveyer 11 configured to convey the sheet S, an image forming engine 5 configured to form a toner image on the sheet S conveyed by the sheet conveyer 11, a fuser 6 configured to fix the toner image on the conveyed sheet S, and a sheet discharge unit 7 configured to discharge the sheet S.

The sheet feed tray 10 and the sheet conveyer 11 constitute a sheet feeder 4. The sheet feed tray 10 is located in a lower portion of the first housing 2, and the sheet conveyer 11 conveys the sheet S supported by the sheet feed tray 10 to the image forming engine 5. The sheet feed tray 10 is configured to slide in the front-rear direction to move between an accommodated position where the sheet feed tray 10 is accommodated in the first housing 2 and a separated position where the sheet feed tray 10 is drawn forward from the accommodated position.

The sheet conveyer 11 includes a sheet feed roller 12, a separation roller 13, a separation pad 13*a*, a conveying roller pair 14, and a registration roller pair 15. In the first housing 2, a conveyance path P for the sheet S from the sheet feed tray 10 to the sheet discharge tray 22*a* via the image forming engine 5 is formed.

The sheets S supported by the sheet feed tray 10 are separated one by one and sent to the conveyance path P by the sheet feed roller 12, the separation roller 13, and the separation pad 13*a*. The sheet feed roller 12 is a roller configured to convey the sheets S from the sheet feed tray 10 toward the image forming engine 5. The separation roller 13 and the separation pad 13*a* constitute a separator configured to separate the sheets S supported by the sheet feed tray 10 one by one.

The sheet S fed to the conveyance path P is conveyed toward the image forming engine 5 by the conveying roller pair 14 and the registration roller pair 15. The registration roller pair 15 regulates the movement of the leading end of the conveyed sheet S to temporarily stop the sheet S, and then conveys the sheet S toward the image forming engine 5 at a predetermined timing.

The image forming engine 5 is located downstream of the sheet conveyer 11 in a sheet conveying direction, and forms an image on the sheet S conveyed by the sheet conveyer 11. The image forming engine 5 includes a process cartridge 50 configured to transfer an image onto a surface of the sheet S conveyed from the sheet feeder 4, a transfer roller 55 that faces a photosensitive drum 54 of the process cartridge 50, and an exposure unit 56 that exposes a surface of the photosensitive drum 54.

The process cartridge 50 is located in the first housing 2 above the sheet feed tray 10, and includes a developer accommodating chamber 51, a supply roller 52, a developing roller 53, the photosensitive drum 54, and the like.

The process cartridge 50 includes a drum cartridge having the photosensitive drum 54 and a developing cartridge attached to the drum cartridge and having the developing roller 53, and is detachably attached to the first housing 2. The process cartridge 50 can be attached to and detached from the first housing 2 when the front cover 21 is at the open position.

In a state where the process cartridge 50 is attached to the first housing 2, the photosensitive drum 54 is disposed such that an axial center X extends in a left-right direction. The photosensitive drum 54 includes a drum shaft 54*a* that is made of metal and that extends in a direction along the axial center X.

The exposure unit 56 includes a laser diode, a polygon mirror, a lens, a reflection mirror and the like, and exposes the surface of the photosensitive drum 54 by irradiating the photosensitive drum 54 with a laser beam based on image data input to the image forming apparatus 1.

The developer accommodating chamber 51 accommodates toner to be used as developer. The toner accommodated in the developer accommodating chamber 51 is fed to the supply roller 52 while being stirred by a conventionally-known stirring member, and the supply roller 52 further supplies the toner fed from the developer accommodating chamber 51 to the developing roller 53.

The developing roller 53 is disposed in close contact with the supply roller 52 and carries toner that is supplied from the supply roller 52 and positively charged by a conventionally-known sliding contact member. A developing bias is applied to the developing roller 53 by a conventionally-known bias applying unit.

The photosensitive drum 54 is adjacent to the developing roller 53. The surface of the photosensitive drum 54 is uniformly charged by a conventionally-known charger and is then exposed to light by the exposure unit 56. A potential of the exposed portion of the photosensitive drum 54 becomes lower than that of the other portion, and an electrostatic latent image based on the image data is formed on the photosensitive drum 54. Then, positively charged toner is supplied from the developing roller 53 to the surface of the photosensitive drum 54 on which the electrostatic latent image is formed, and the electrostatic latent image is developed into a toner image.

The transfer roller 55 faces the photosensitive drum 54, and a transfer bias is applied to the transfer roller 55 by a conventionally-known bias applying unit. The toner image formed on the surface of the photosensitive drum 54 is transferred onto a surface of a sheet S as the sheet S is nipped and conveyed between the photosensitive drum 54 on which the toner image is formed and the transfer roller 55 in a state where the transfer bias is applied to a surface of the transfer roller 55. The sheet S onto which the toner image has been transferred is conveyed to the fuser 6.

The fuser 6 includes a heating rotating member 61 and a pressing rotating member 62, and fixes the toner image transferred from the photosensitive drum 54 of the process cartridge 50 to the sheet S. The heating rotating member 61 is heated by electric power supplied from a conventionally-known power source. The pressing rotating member 62 and the heating rotating member 61 oppose to each other, and the heating rotating member 61 is biased toward the pressing rotating member. The pressing rotating member 62 nips the sheet S together with the heating rotating member 61.

When the sheet S to which the toner image has been transferred is conveyed to the fuser 6, the sheet S is conveyed and heated while being nipped between the heating rotating member 61 and the pressing rotating member 62 to fix the toner image to the sheet S. In this manner, the fuser 6 fixes the toner image transferred from the photosensitive drum 54 to the conveyed sheet S.

The sheet discharge unit 7 is located downstream of the image forming engine 5 in the sheet conveying direction, and discharges the sheet S on which an image has been formed by the image forming engine 5 to the outside of the image forming apparatus 1. The sheet discharge unit 7 includes an intermediate sheet discharge roller pair 71, and a sheet discharge roller pair 72 located downstream of the intermediate sheet discharge roller pair 71 in the sheet conveying direction. The sheet S conveyed from the fuser 6 along the conveyance path P is discharged to the outside of the first housing 2 by the intermediate sheet discharge roller pair 71 and the sheet discharge roller pair 72. The sheet S discharged to the outside of the first housing 2 is supported by the sheet discharge tray 22*a* formed on the upper surface 22 of the first housing 2.

The second housing 3 is located above the first housing 2. The second housing 3 includes a document platen 31, a document presser 32, and an operation panel 33. The document platen 31 is supported by a support column 23 extending upward from the upper surface 22 of the first housing 2. The document platen 31 accommodates an image reading sensor 312. The image reading sensor 312 reads an image of a document placed on an upper surface 311 of the document platen 31.

The document presser 32 is located above the document platen 31. The document presser 32 is configured to swing about a rotation shaft 321 which is at a rear end portion of the document presser 32, and is movable between a pressing position at which the document presser 32 covers the upper surface 311 of the document platen 31 and an open position at which the document presser 32 exposes the upper surface 311 of the document platen 31. The document presser 32 presses a document placed on the upper surface 311 of the document platen 31 when the document presser 32 is at the pressing position.

The operation panel 33 is connected to the document platen 31 of the second housing 3 and is projecting forward from the document platen 31. The operation panel 33 includes a display tool such as a liquid crystal panel and an operation tool such as a touch panel or operation buttons for operating the image forming apparatus 1.

Fuser

Figure 2:
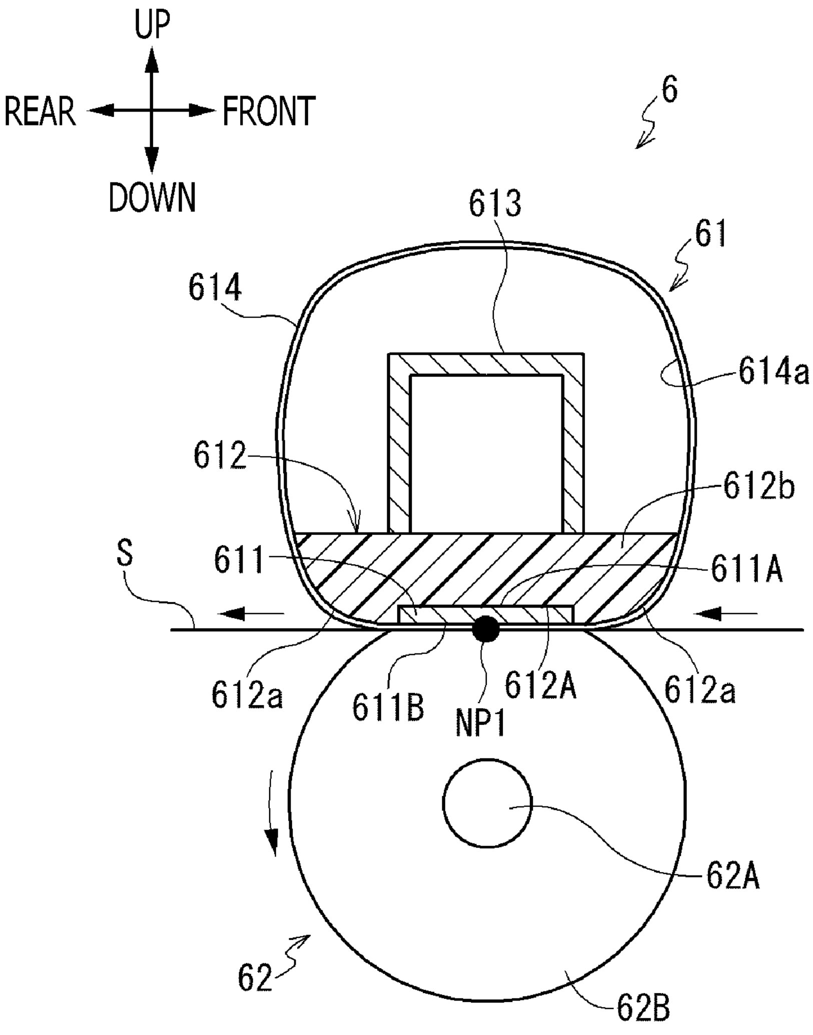
FIG. 2 is a side cross-sectional view schematically showing a fuser.
Figure 3:
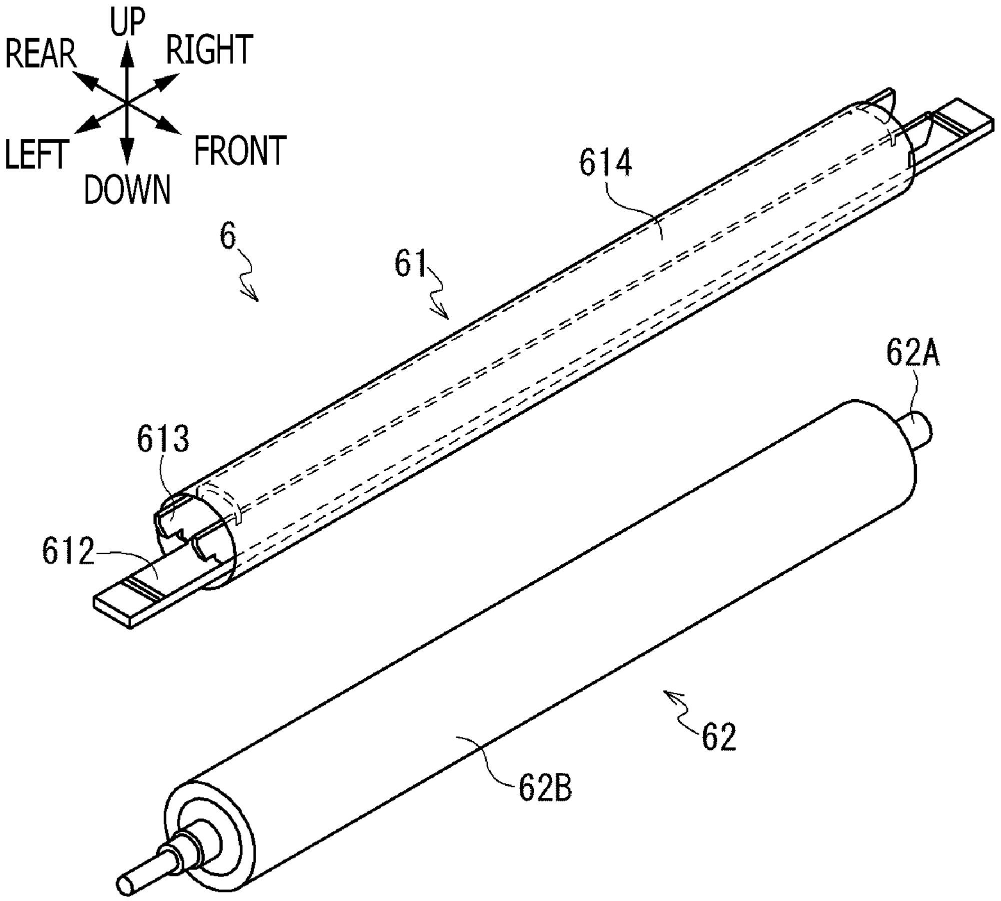
FIG. 3 is a perspective view of a heating rotating member and a pressing rotating member of the fuser.

As shown in FIGS. 2 and 3, the heating rotating member 61 of the fuser 6 includes a heater 611, a holder 612, a stay 613, and a belt 614. The heater 611 is a flat plate-shaped heater extending in the left-right direction. The heater 611 includes a first surface 611A, and a second surface 611B opposite to the first surface 611A. The first surface 611A is supported by the holder 612.

The holder 612 is made for example of a plastic member, and includes guide surfaces 612*a* and a support wall 612*b*. The guide surfaces 612*a* are in contact with an inner circumferential surface 614*a* of the belt 614 to guide the belt 614. The support wall 612*b* includes a support surface 612A that supports the heater 611. The support surface 612A of the support wall 612*b* is in contact with the first surface 611A of the heater 611. The stay 613 is a member that supports the holder 612, and is formed by bending a plate material having a higher rigidity than the holder 612, such as a steel plate, into a substantially U-shape in a cross-sectional view.

The belt 614 is an endless belt having heat resistance and flexibility, and includes a metal tube made of stainless steel or the like, and a fluorine resin layer covering the metal tube. The heater 611, the holder 612, and the stay 613 are located inside the belt 614. The belt 614 is configured to rotate around the heater 611, the holder 612, and the stay 613. The inner circumferential surface 614*a* of the belt 614 is in contact with the heater 611.

The pressing rotating member 62 includes a shaft 62A made of metal, and a roller 62B made of an elastic body and covering the shaft 62A. The pressing rotating member 62 is pressed against the heater 611 across the belt 614. The pressing rotating member 62 nips the belt 614 with the heater 611 to form a nip point NP1 for nipping, heating, and pressing the sheet S. That is, the pressing rotating member 62 heats and presses the sheet S together with the heater 611 at the nip point NP1.

The pressing rotating member 62 is configured to be rotationally driven by a driving force transmitted from a driving source included in the image forming apparatus 1. As the pressing rotating member 62 is rotationally driven, the belt 614 is rotated by a friction force between the belt 614 and the pressing rotating member 62 or between the belt 614 and the sheet S nipped at the nip point NP1. The toner image transferred onto the sheet S is fixed to the sheet S as the sheet S is conveyed between the pressing rotating member 62 and the heated belt 614.

Figure 4:
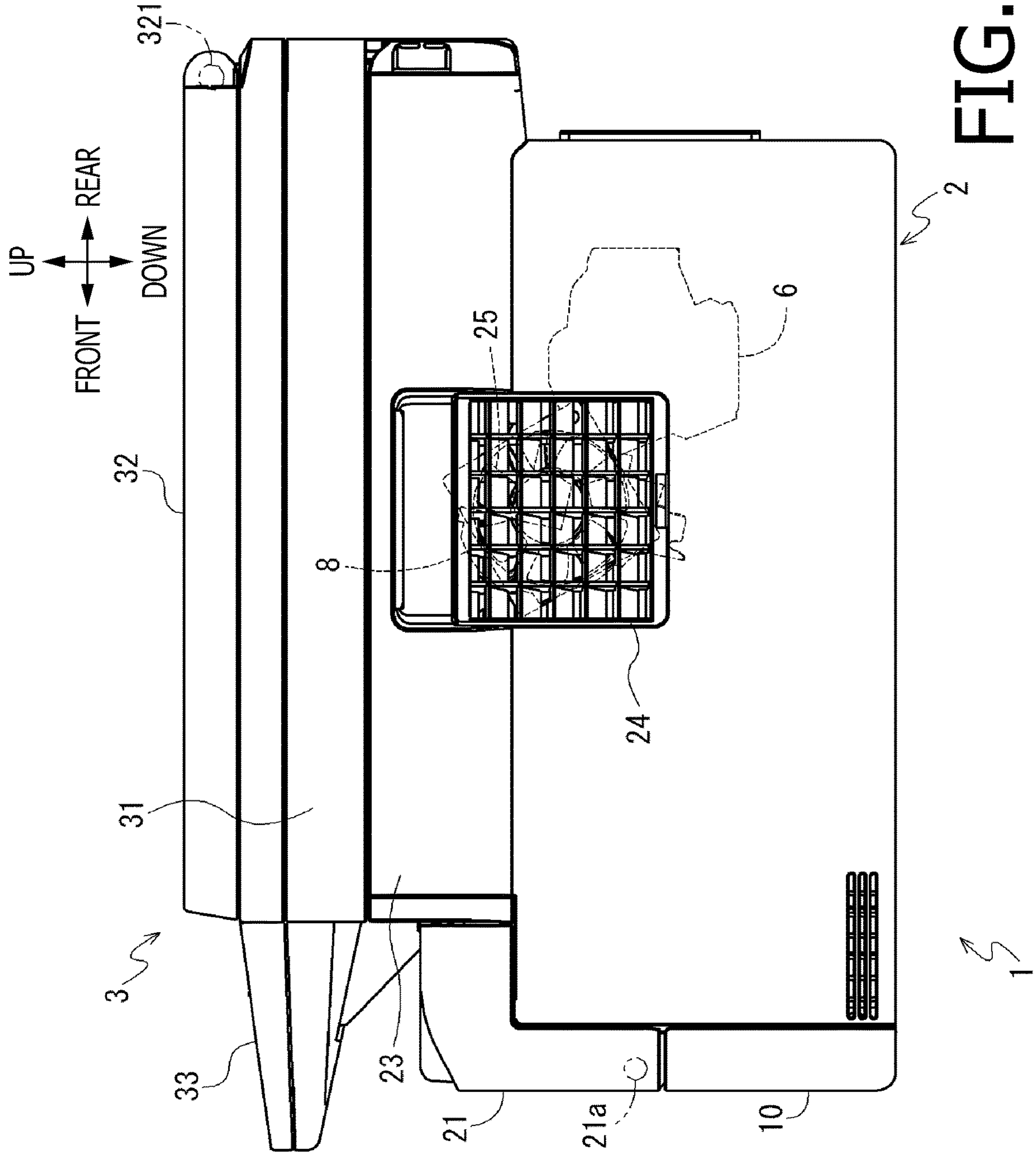
FIG. 4 is a side view of the image forming apparatus.
Figure 5:
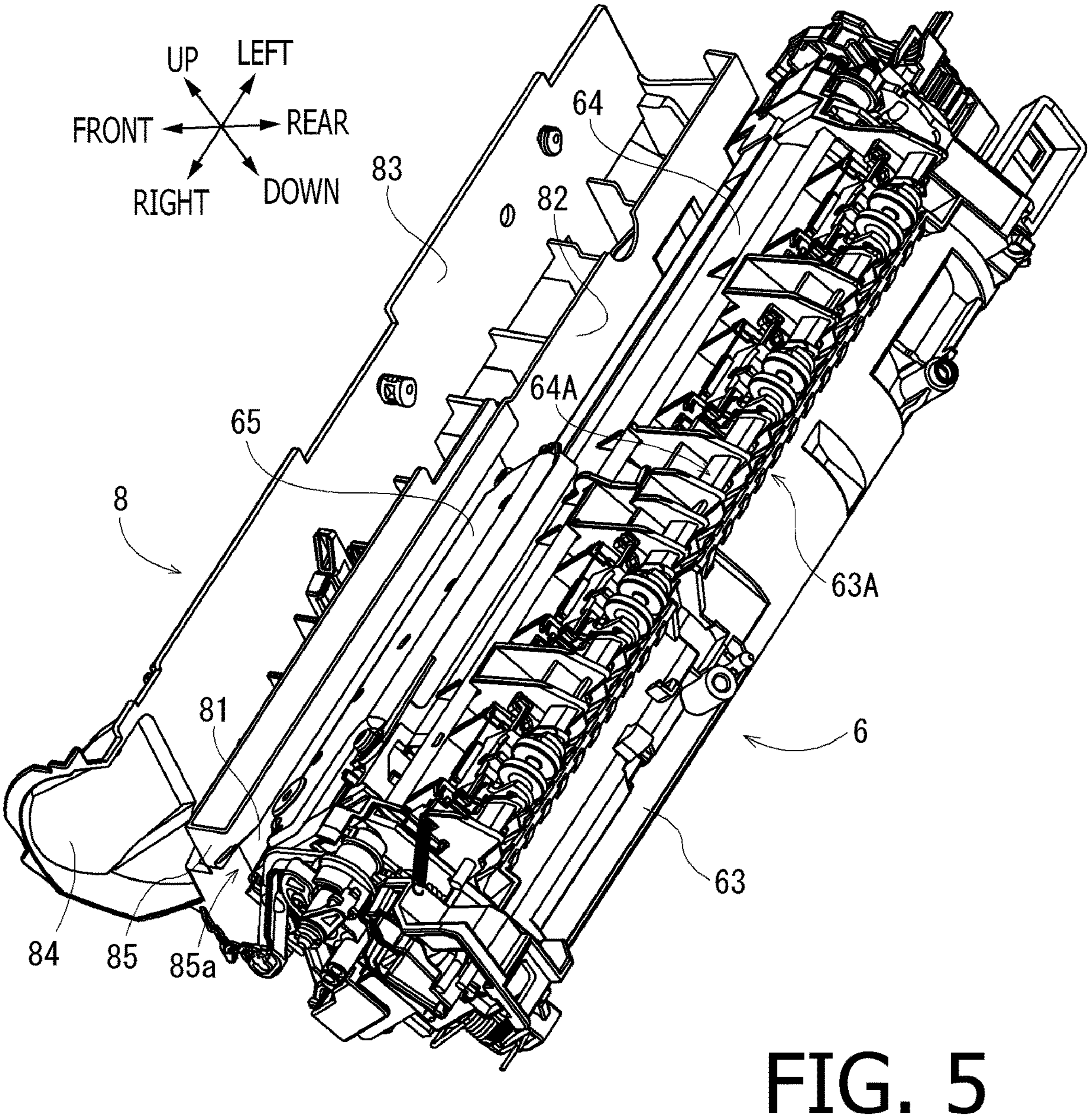
FIG. 5 is a perspective view of the fuser and an air duct.

As shown in FIG. 4, an exhaust port 24 that communicates the inside and the outside of the first housing 2 is formed on a right surface of the first housing 2. Inside the first housing 2, a fan 25 is disposed adjacent to the exhaust port 24. Inside the first housing 2, an air duct 8 that guides air inside the first housing 2 toward the fan 25 is disposed in front of the fuser 6.

In the image forming apparatus 1, air and the like heated by the heating rotating member 61 of the fuser 6 is exhausted from the exhaust port 24 to the outside of the first housing 2 by the fan 25. In this case, the air and the like heated by the heating rotating member 61 is guided toward the fan 25 by the air duct 8.

As shown in FIGS. 1 and 5 to 8, the fuser 6 includes a lower frame 63 that supports the heating rotating member 61 and the pressing rotating member 62, and an upper frame 64 that is located above the lower frame 63 and covers the heating rotating member 61.

The upper frame 64 includes an upper sheet guide 64A that is located downstream of the heating rotating member 61 and the pressing rotating member 62 in the sheet conveying direction and guides an upper surface of the sheet S conveyed along the conveyance path P. The lower frame 63 includes a lower sheet guide 63A that is located downstream of the heating rotating member 61 and the pressing rotating member 62 in the sheet conveying direction and guides a lower surface of the sheet S conveyed along the conveyance path P.

The conveyance path P in the fuser 6 extends in a direction substantially along the front-rear direction, and is inclined upward from the front toward the rear. That is, the sheet conveying direction in the fuser 6 is substantially in the front-rear direction.

A static electricity remover 65 configured to remove static electricity generated in the fuser 6 is attached to an upper surface of the upper frame 64. The static electricity remover 65 is located at a right half portion of the upper frame 64.

In the present embodiment, the heating rotating member 61 includes the heater 611 and the belt 614. However, for example, the heating rotating member 61 may be a heating roller with a built-in heater. In the present embodiment, the pressing rotating member 62 includes the shaft 62A and the roller 62B. However, the pressing rotating member 62 may include a pressing belt pressed against the heating rotating member 61 by an elastic member.

Upper Sheet Guide of Upper Frame

Figure 9:
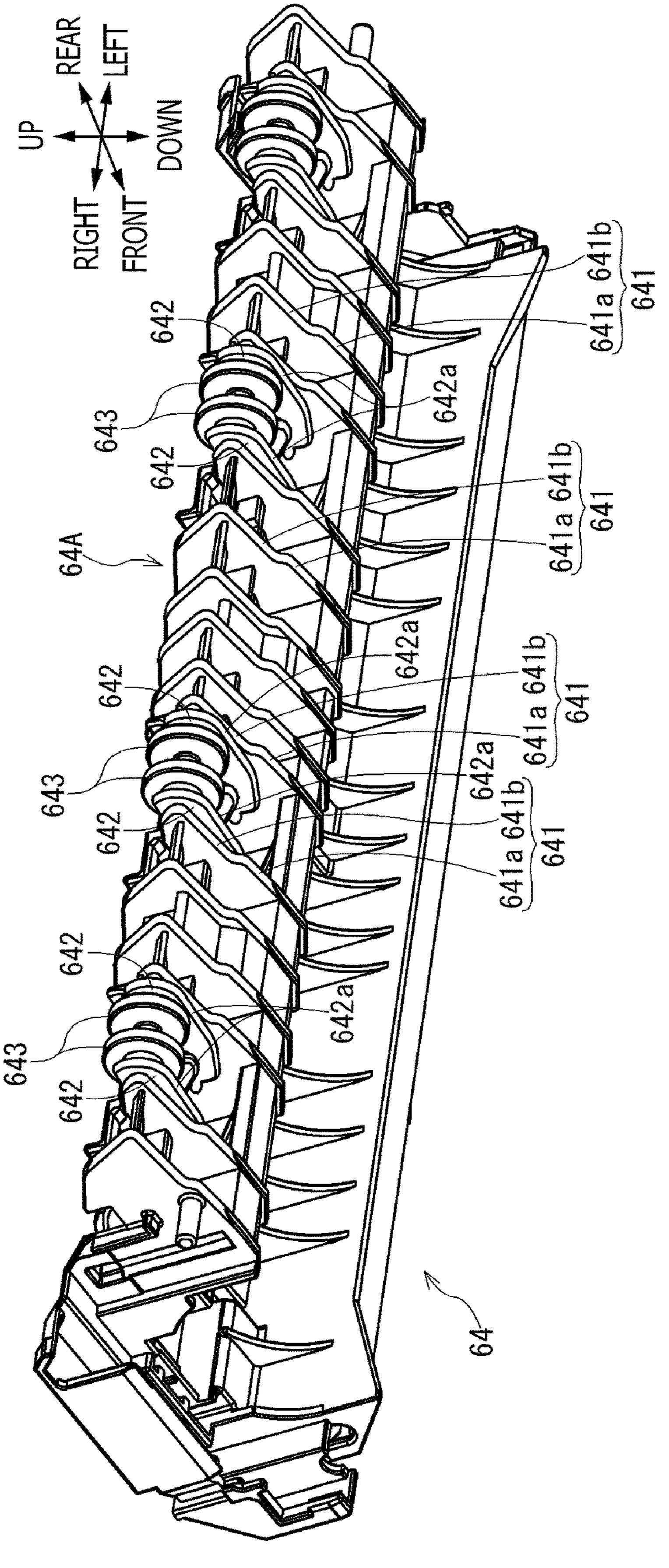
FIG. 9 is a perspective view of an upper frame.
Figure 10:
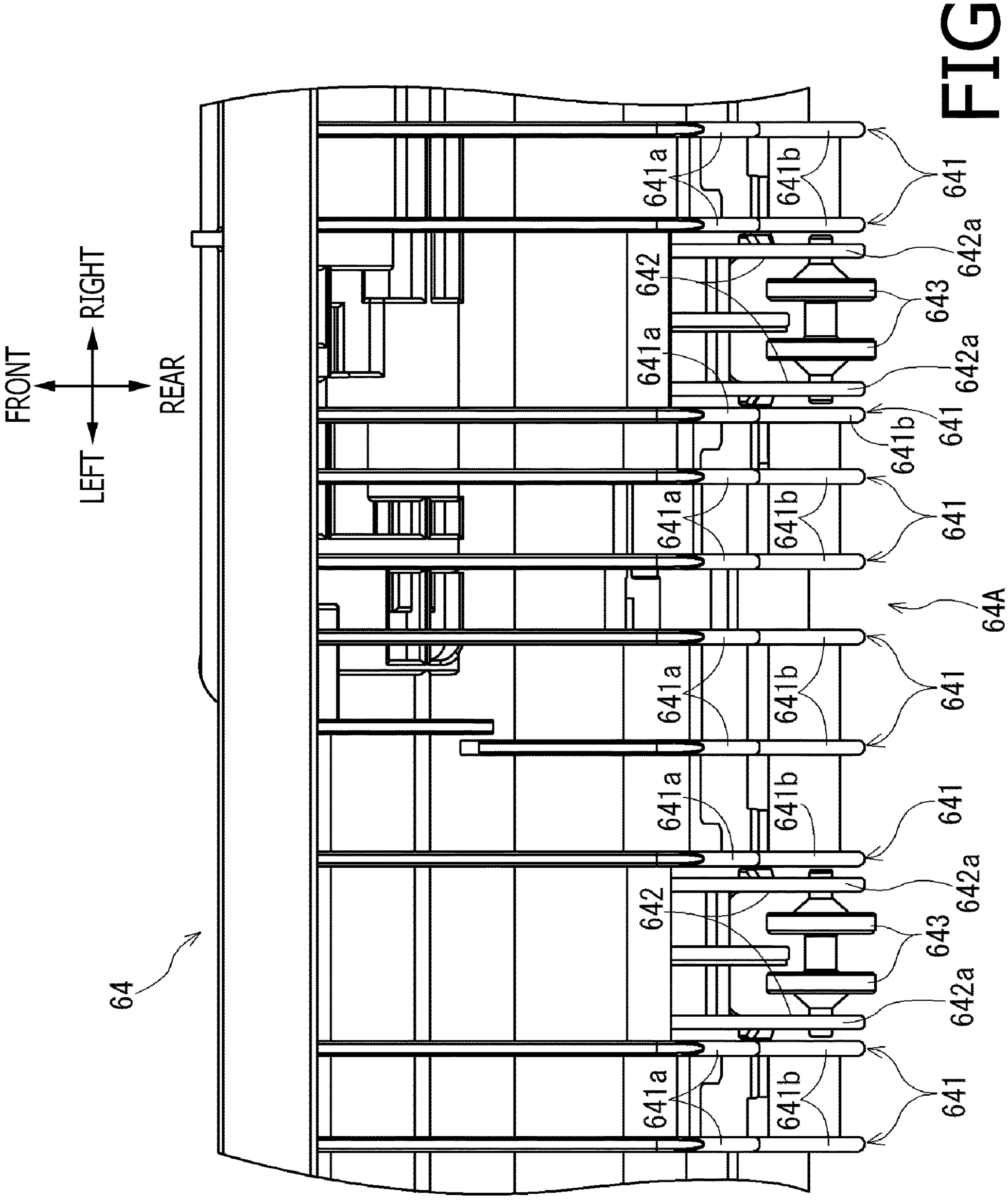
FIG. 10 is a bottom view of the upper frame.
Figure 11:
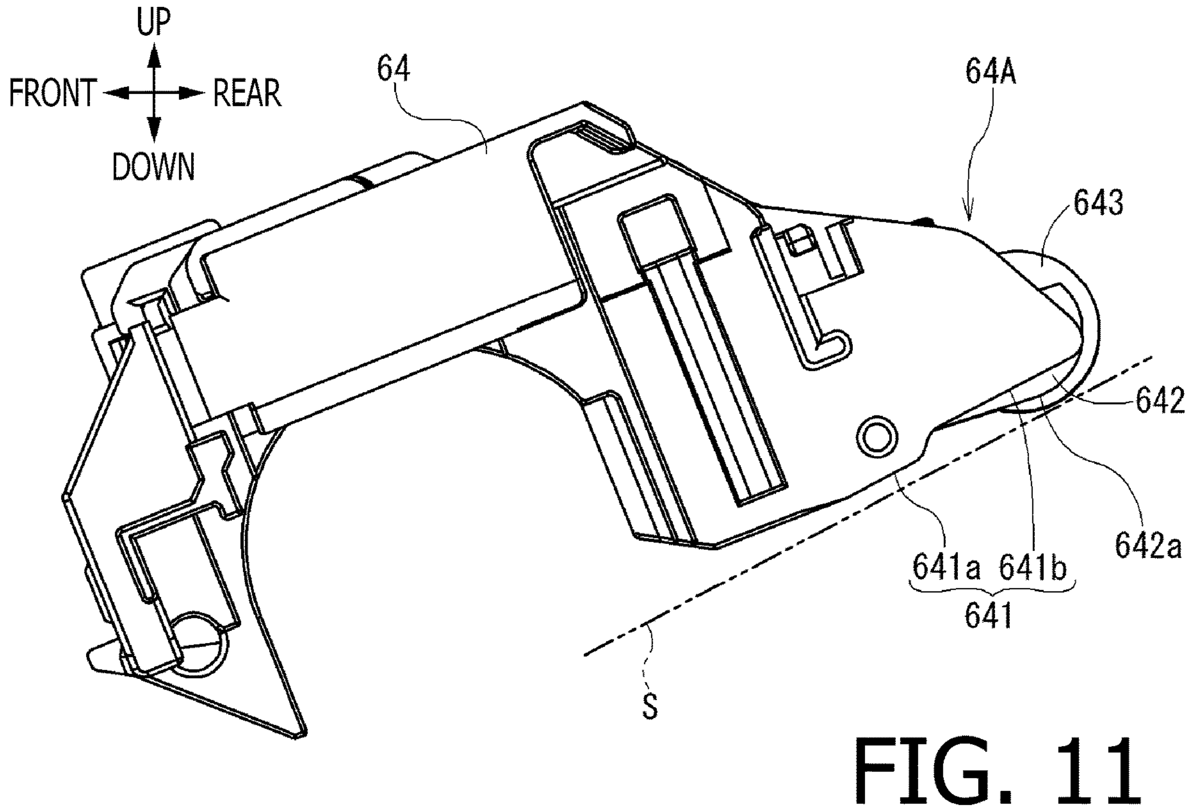
FIG. 11 is a side view of an upper frame.

As shown in FIGS. 9 to 11, the upper sheet guide 64A of the upper frame 64 includes upper first ribs 641, upper second ribs 642, and rollers 643. The upper first ribs 641, the upper second ribs 642, and the rollers 643 are located downstream of the heating rotating member 61 and the pressing rotating member 62 in the sheet conveying direction.

The upper first ribs 641 extend in the sheet conveying direction. A plurality of upper first ribs 641 are arranged in the left-right direction The left-right direction in the fuser 6 is a widthwise direction orthogonal to the sheet conveying direction.

Each upper first rib 641 includes a first guide surface 641*a* configured to guide the upper surface of the sheet S conveyed along the conveyance path P, and a separation surface 641*b* located downstream of the first guide surface 641*a* in the sheet conveying direction. The separation surface 641*b* is located farther from a later-described nip point NP2 between a later-described driving roller 66 and a later-described roller 643 than the first guide surface 641*a* in a direction orthogonal to the sheet conveying direction and the widthwise direction. The direction orthogonal to the sheet conveying direction and the widthwise direction is a direction substantially along the up-down direction.

The upper second ribs 642 are located adjacent to the upper first ribs 641 in the left-right direction, and extends along the sheet conveying direction. Each upper second rib 642 includes a second guide surface 642*a* located closer to the conveyed sheet S than the separation surface 641*b* of the upper first rib 641 in the direction orthogonal to the sheet conveying direction and the widthwise direction. The second guide surface 642*a* is configured to guide the upper surface of the sheet S conveyed along the conveyance path P.

The image forming apparatus 1 includes driving rollers 66 facing the rollers 643, respectively. The driving rollers 66 nip the sheet S together with the rollers 643 (see FIG. 8). The rollers 643 nip the sheet S together with the driving rollers 66 to convey the sheet S. In the direction orthogonal to the sheet conveying direction and the widthwise direction, a distance d1 between the second guide surface 642*a* and a nip point NP2 between the roller 643 and the driving roller 66 is smaller than a distance d2 between the separation surface 641*b* and the nip point NP2.

That is, the distance d1 between the second guide surface 642*a* and the nip point NP2 is smaller than the distance d2 between the separation surface 641*b* and the nip point NP2, and the second guide surface 642*a* is closer to the conveyed sheet S than the separation surface 641*b*. Therefore, when the sheet S passes through a position, in the sheet conveying direction, where the second guide surface 642*a* and the separation surface 641*b* are, the sheet S is guided by the second guide surface 642*a*.

When the sheet S conveyed along the conveyance path P passes through the fuser 6, the sheet S is heated by the heating rotating member 61, and moisture contained in the sheet S evaporates to generate water vapor. When the generated water vapor adheres to the upper first ribs 641 and the upper second ribs 642, the water vapor may condense into water droplets, and the water droplets adhered to the upper first ribs 641 and the upper second ribs 642 may be wiped off by the sheet S guided by the upper first ribs 641 and the upper second ribs 642.

For example, when executing duplex printing on the sheet S with the image forming apparatus 1, if the sheet S passing through the fuser 6 during printing of one side thereof wipes off water droplets adhered to the upper first ribs 641 and the upper second ribs 642, the water droplets wiped off by the sheet S may be transferred to the photosensitive drum 54 when the sheet S after the printing of one side thereof is re-conveyed to the photosensitive drum 54.

On the other hand, when the sheet S conveyed along the conveyance path P passes through the upper sheet guide 64A of the upper frame 64, the sheet S is guided by the first guide surfaces 641*a* of the upper first ribs 641, and then guided by the second guide surfaces 642*a* of the upper second ribs 642 adjacent to the upper first ribs 641 in the left-right direction.

Figure 12A:
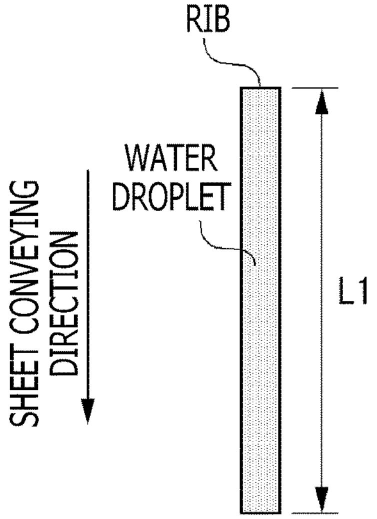
FIG. 12A is a diagram showing a length of a portion of a sheet that contacts a rib.
Figure 12B:
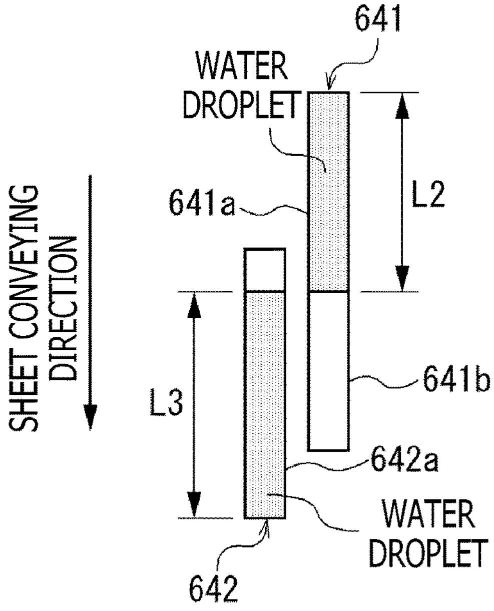
FIG. 12B is a diagram showing lengths of portions of a sheet that contact the ribs.
Figure 13:
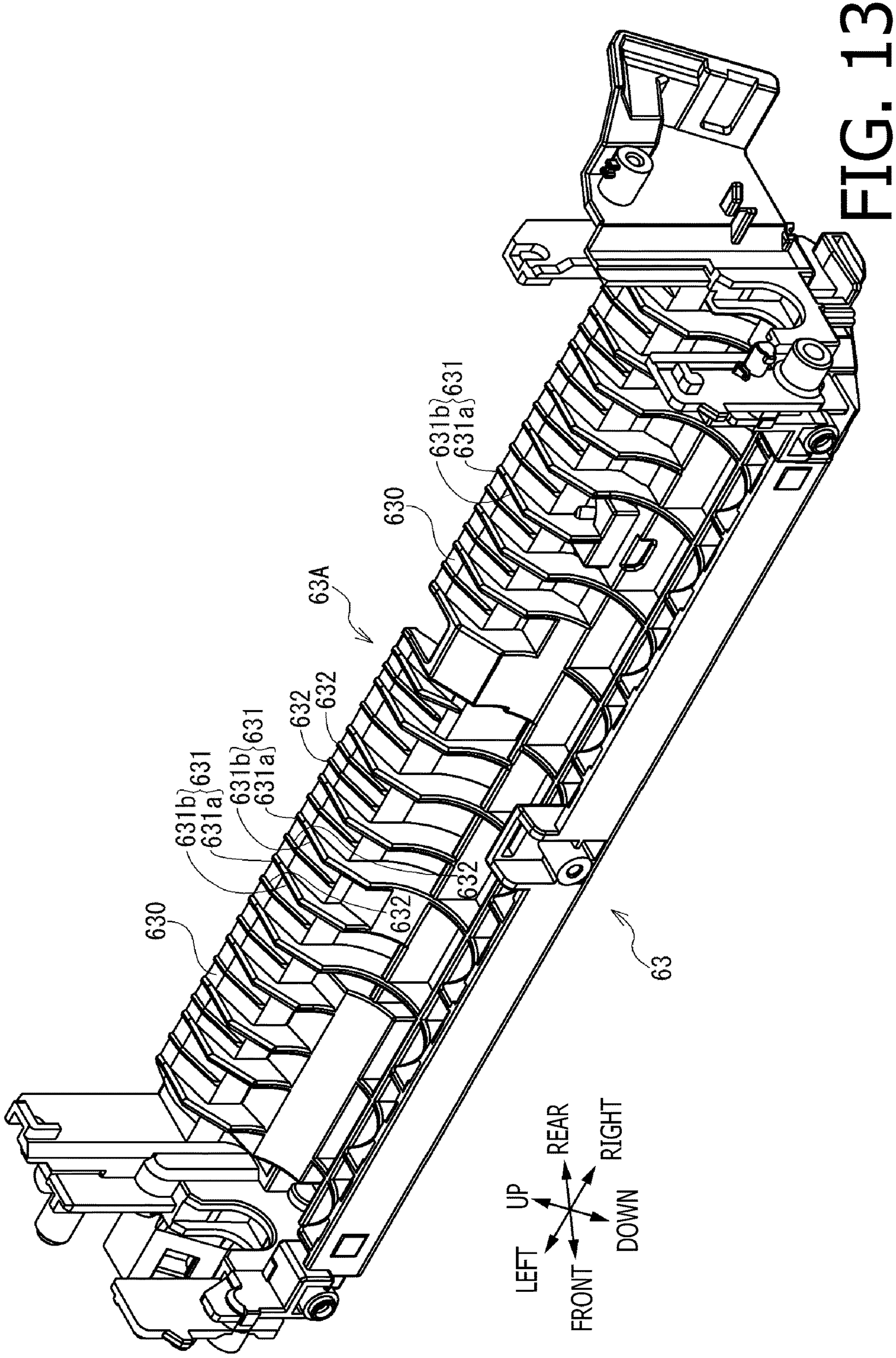
FIG. 13 is a perspective view of a lower frame.
Figure 15:
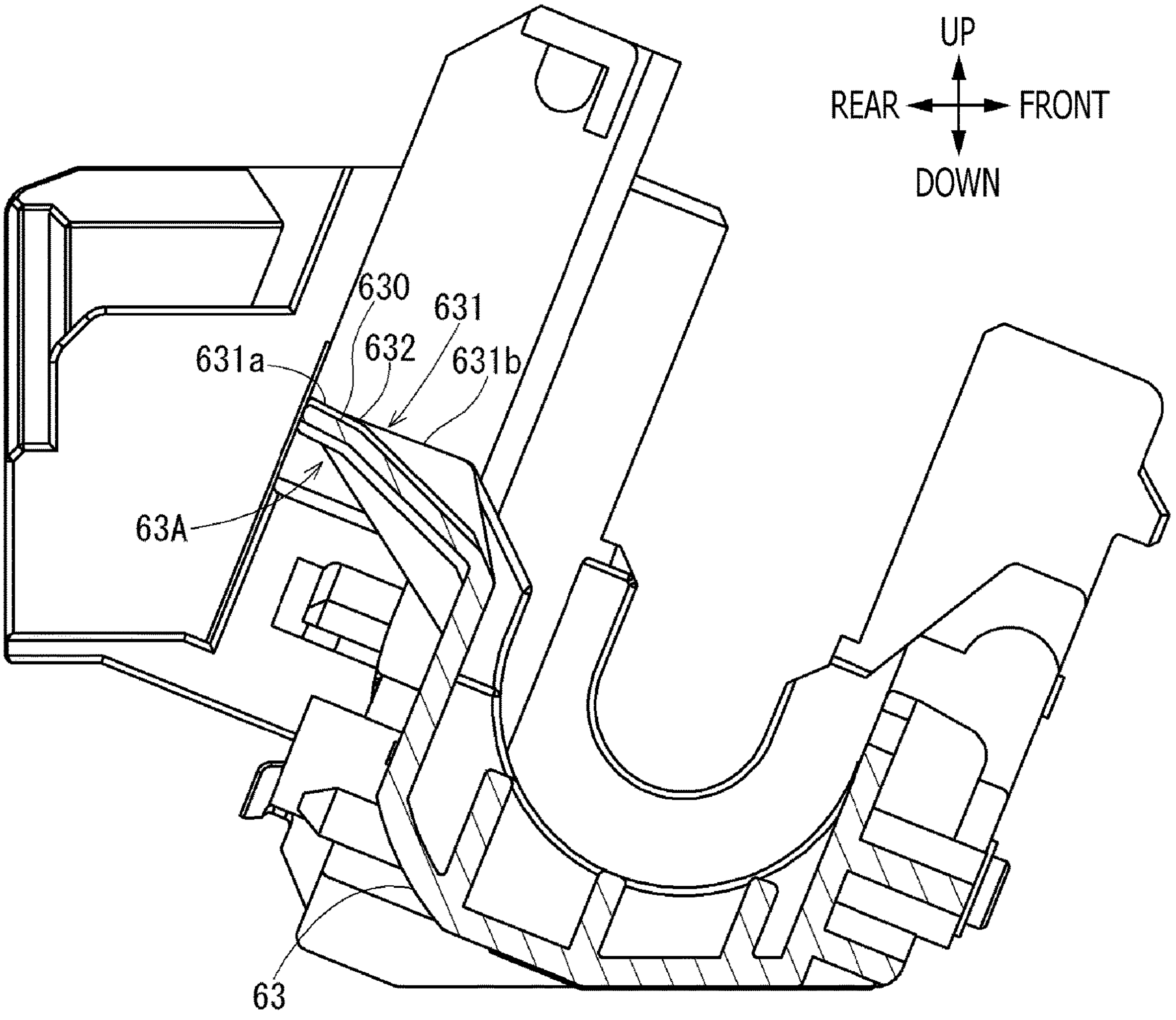
FIG. 15 is a side cross-sectional view of the lower frame.

As described above, in the upper frame 64, ribs that guide the conveyed sheet S can be taken over from the upper first ribs 641 to the upper second ribs 642. Therefore, as illustrated in FIGS. 12A and 12B, provided that a guiding length of the sheet S by one or more ribs in the sheet conveying direction is the same, for example, a length L2 in the sheet conveying direction of a portion of the sheet S that contacts the first guide surface 641*a* of the upper first rib 641 (see FIG. 12B) and a length L3 in the sheet conveying direction of a portion of the sheet S that contact the second guide surface 642*a* of the upper second rib 642 (see FIG. 12B) can be made shorter than a length L1 in the sheet conveying direction of a portion of the sheet S guided by one rib that is not divided in the sheet conveying direction (see FIG. 12A).

Therefore, it is possible to reduce the amount of moisture adhering to the sheet S from one upper first rib 641 and the amount of moisture adhering to the sheet S from one upper second rib 642. That is, the amount of moisture adhering to the sheet S from one rib can be reduced. Accordingly, if the number of ribs arranged in the left-right direction is the same, it is possible to reduce the amount of moisture to be transferred from the sheet S to the photosensitive drum 54 and thereby suppress the occurrence of stain on the sheet S. Additionally, the occurrence of stain on the sheet S can also be reduced due to the reduction of the length in the sheet conveying direction of areas to which moisture adheres.

The upper second ribs 642 are disposed on both sides in the left-right direction of each roller 643, and each roller 643 is supported by the upper second ribs 642 disposed on both sides in the left-right direction. The upper first ribs 641 are disposed on both sides in the left-right direction of the two upper second ribs 642 supporting one roller 643.

By configuring the upper second ribs 642 to support the roller 643 as described above, the upper second ribs 642 can be used both as guide ribs and as members for supporting the rollers 643. Therefore, it is possible to reduce area of the upper frame 64 that contacts the sheet S.

Lower Sheet Guide of Lower Frame

As shown in FIGS. 13 to 16, the lower sheet guide 63A of the lower frame 63 includes lower guide surfaces 630, lower first ribs 631, and lower second ribs 632. The lower guide surfaces 630, the lower first ribs 631, and the lower second ribs 632 are located downstream of the heating rotating member 61 and the pressing rotating member 62 in the sheet conveying direction. The lower guide surfaces 630 extend in the left-right direction and are facing substantially up.

The lower first ribs 631 project upward from the lower guide surfaces 630 and extend in the sheet conveying direction. A plurality of lower first ribs 631 are arranged in the left-right direction and guide the lower surface of the conveyed sheet S.

Each lower first rib 631 includes a first portion 631*a* which is a downstream end portion of the lower first rib 631 in the sheet conveying direction, and a second portion 631*b* extending from the first portion 631*a* toward the upstream side in the sheet conveying direction. In the sheet conveying direction, the first portion 631*a* and a downstream end portion of the second portion 631*b* are located on the lower guide surface 630. The other portion of the second portion 631*b* is located upstream of the lower guide surface 630 in the sheet conveying direction.

A projection height of the first portion 631*a* from the lower guide surface 630 is h1, and a projection height of the downstream end portion of the second portion 631*b* in the sheet conveying direction from the lower guide surface 630 is h1 which is the same as the projection height of the first portion 631*a*. The second portion 631*b* is inclined upward from the downstream end portion toward the upstream side in the sheet conveying direction, and a projection height of the upstream end portion of the second portion 631*b* from the lower guide surface 630 is h2. The projection height h2 of the upstream end portion of the second portion 631*b* is greater than the projection height h1 of the first portion 631*a*. That is, an upper end of the second portion 631*b* is higher than an upper end of the first portion 631*a*.

Each lower second rib 632 projects upward from the lower guide surface 630 and extends in the sheet conveying direction. Each lower second rib 632 is located between two lower first ribs 631 in the left-right direction, and a plurality of lower second ribs 632 are arranged in the left-right direction. The lower second ribs 632 guides the lower surface of the conveyed sheet S.

A projection height of the lower second rib 632 from the lower guide surface 630 is h3. The projection height h3 of the lower second rib 632 is the same as the projection height h1 of the first portion 631*a* of the lower first rib 631. That is, an upper end of the lower second rib 632 and the upper end of the first portion 631*a* of the lower first rib 631 are at the same height.

The lower second ribs 632 are formed over a range, in the sheet conveying direction, where the lower guide surfaces 630 are present, and a length L4 of the lower second ribs 632 in the sheet conveying direction is shorter than a length L5 of the lower first ribs 631 in the sheet conveying direction.

Positions of downstream ends of the lower second ribs 632 coincide with positions of downstream ends of the first portions 631*a* of the lower first ribs 631, and the lower second ribs 632 are located at positions overlapping the downstream end portion of the lower first ribs 631 in the sheet conveying direction. That is, the lower second ribs 632 are located at positions overlapping the downstream end portion of the second portions 631*b* and the first portions 631*a* of the lower first ribs 631 when viewed in the left-right direction which is the direction along the axial center X of the drum shaft 54*a*.

In the lower sheet guide 63A of the lower frame 63, water droplets caused by moisture evaporated from the sheet S easily accumulate on the lower guide surfaces 630 which are portions where the downstream end portions of the lower first ribs 631 in the sheet conveying direction are located. Therefore, if only the lower first ribs 631 are provided on the lower guide surfaces 630, water droplets accumulated on the lower guide surfaces 630 easily adhere to the sheet S when the sheet S guided by the lower first ribs 631 deflects between two lower first ribs 631 in the left-right direction, the water droplets accumulated on the lower guide surface are likely to adhere to the sheet S.

However, in the lower frame 63, since each lower second rib 632 is provided between the downstream end portions of two lower first ribs 631, even if the sheet S guided by the lower first ribs 631 deflects in the left-right direction between the lower first ribs 631, the deflected portion of the sheet S can be supported by the lower second ribs 632. Therefore, the amount of moisture adhering to the sheet S can be reduced and thus occurrence of stain on the sheet S can be suppressed.

Figure 16:
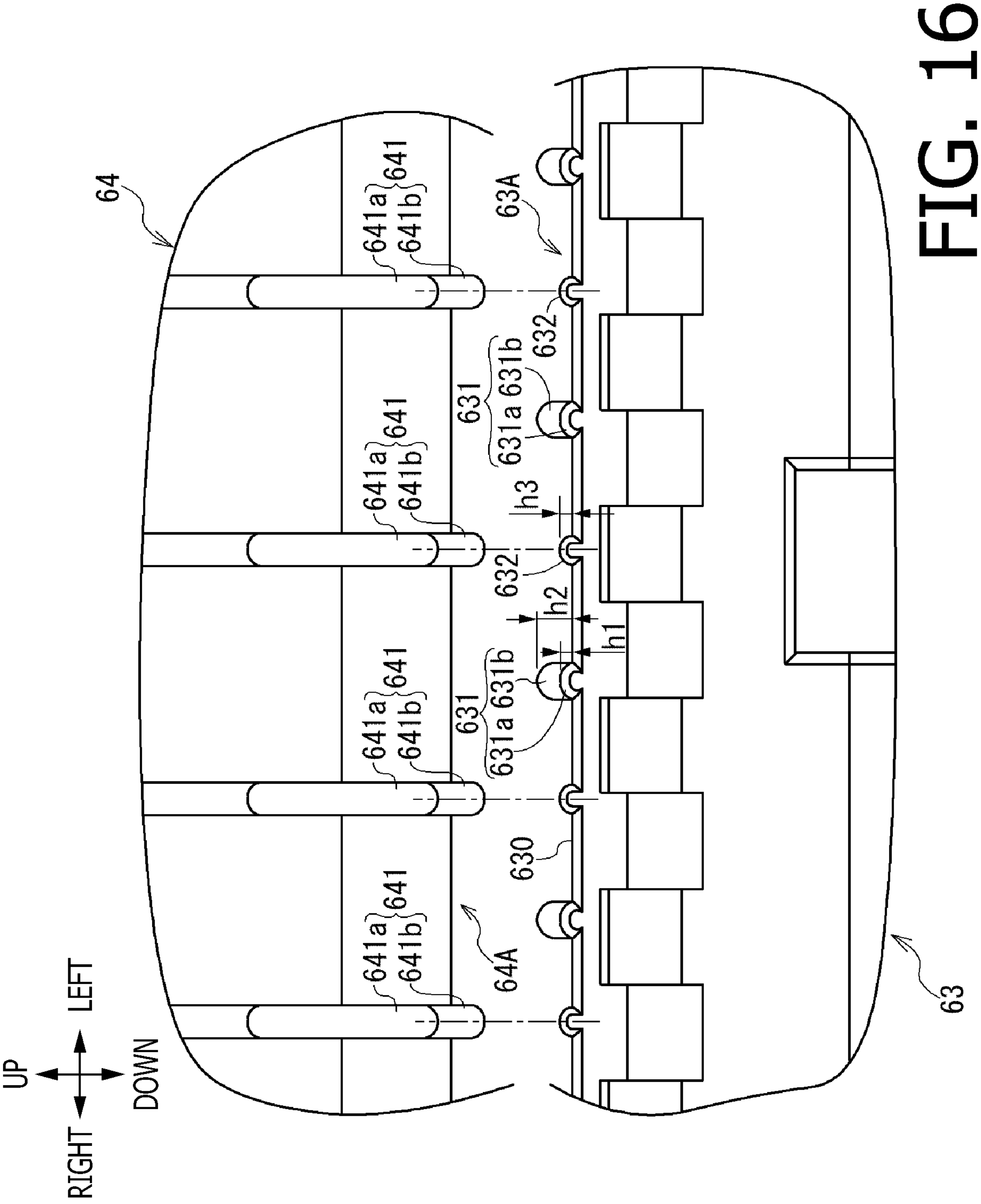
FIG. 16 is a rear view of the lower frame and the upper frame.

As shown in FIG. 16, in the lower frame 63, upper ends of the lower first ribs 631 and upper ends of the lower second ribs 632 are formed in an arcuate shape. Therefore, when the conveyed sheet S contacts the lower first ribs 631 and the lower second ribs 632, a contact area between the sheet S and the lower first ribs 631 and a contact area between the sheet S and the lower second ribs 632 can be reduced, and the amount of moisture contacting the sheet S can be further reduced.

In the lower frame 63, the upper ends of the second portions 631*b* of the lower first ribs 631 are higher than the upper ends of the first portions 631*a* of the lower first ribs 631. Therefore, when a finger is inserted into a clearance between the lower sheet guide 63A of the lower frame 63 and the upper sheet guide 64A of the upper frame 64 from the downstream side in the sheet conveying direction, the inserted finger contacts the second portions 631*b* of the lower first ribs 631 and thus it is possible to prevent the finger from entering into an upstream side of the first portion 631*a* of the lower first rib 631 in the sheet conveying direction.

The lower second ribs 632 are located at positions overlapping the upper first ribs 641 in the left-right direction. That is, positions of the lower second ribs 632 and the upper first ribs 641 in the left-right direction coincide with each other when viewed in the sheet conveying direction.

Therefore, gaps in the fuser 6 between the lower frame 63 and the upper frame 64 at portions where the lower second ribs 632 and the upper first ribs 641 are formed can be reduced, and thus it is possible to suppress a finger from entering between the lower frame 63 and the upper frame 64.

Furthermore, each lower first rib 631 is located between two upper first ribs 641 in the left-right direction. Therefore, the gap between the lower frame 63 and the upper frame 64 at positions between the upper first ribs 641 can be reduced by the lower first ribs 631, and thus it is possible to suppress a finger from entering between the lower frame 63 and the upper frame 64.

Modification of Lower Sheet Guide

Figure 17:
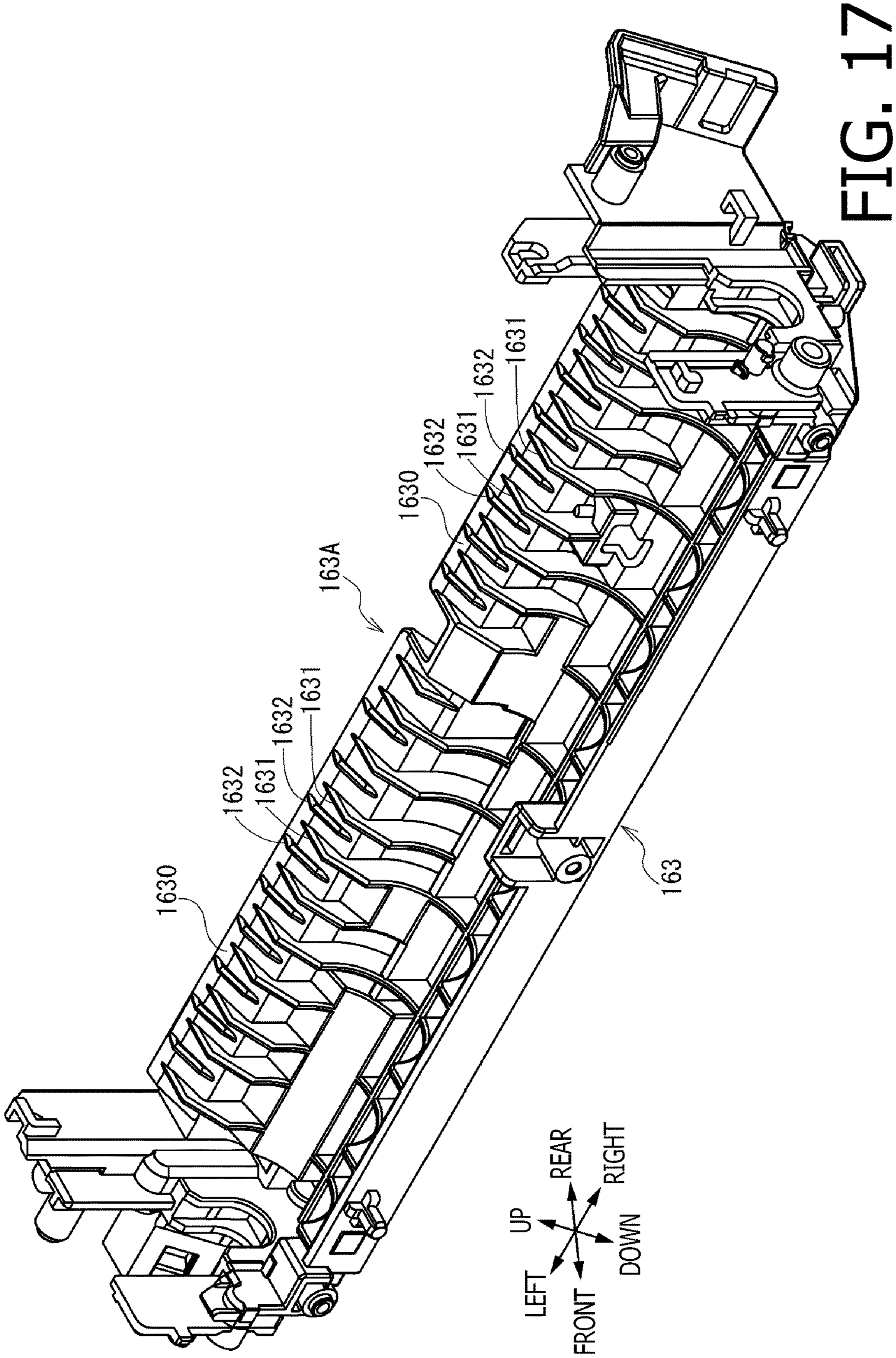
FIG. 17 is a perspective view of a modified lower frame.
Figure 18A:
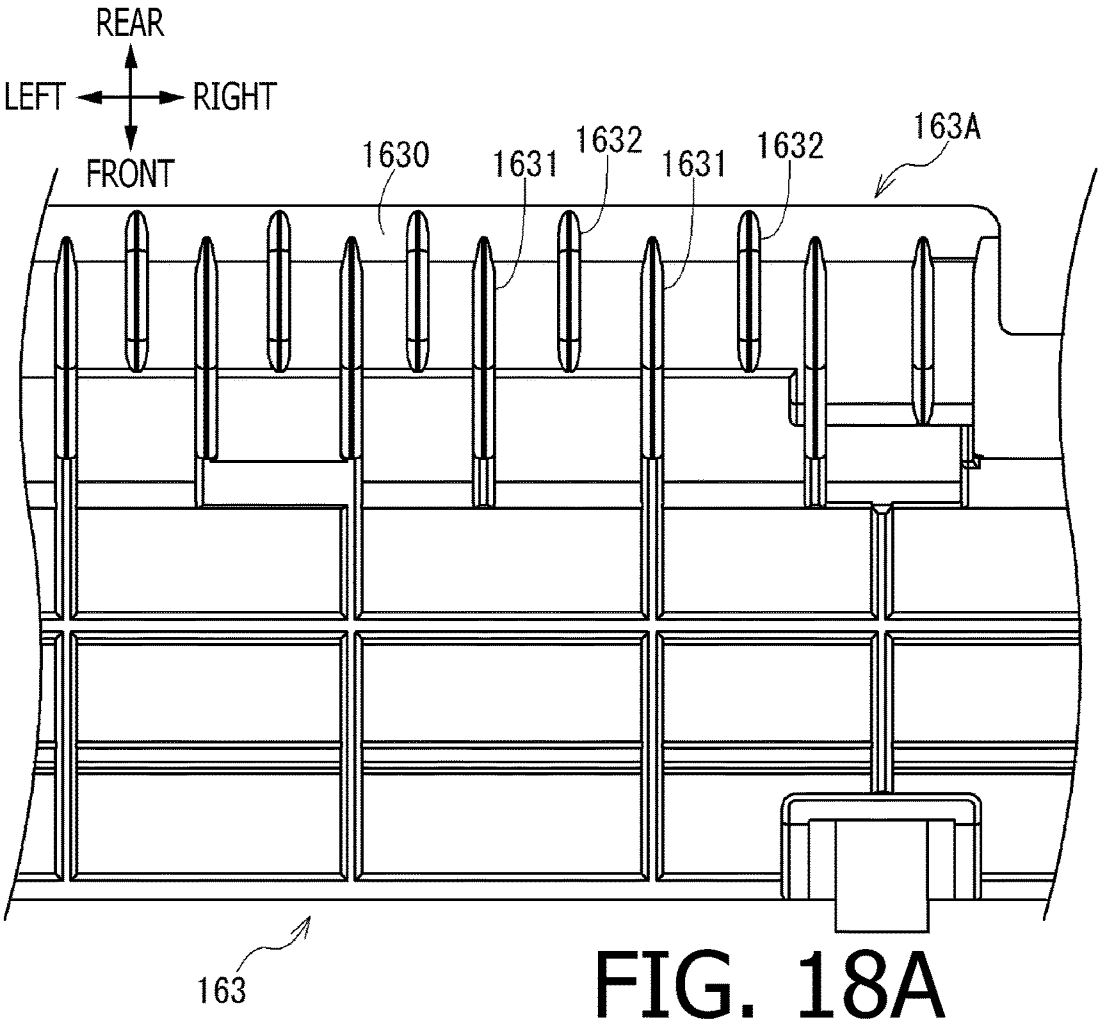
FIG. 18A is a plan view of the modified lower frame.
Figure 18B:
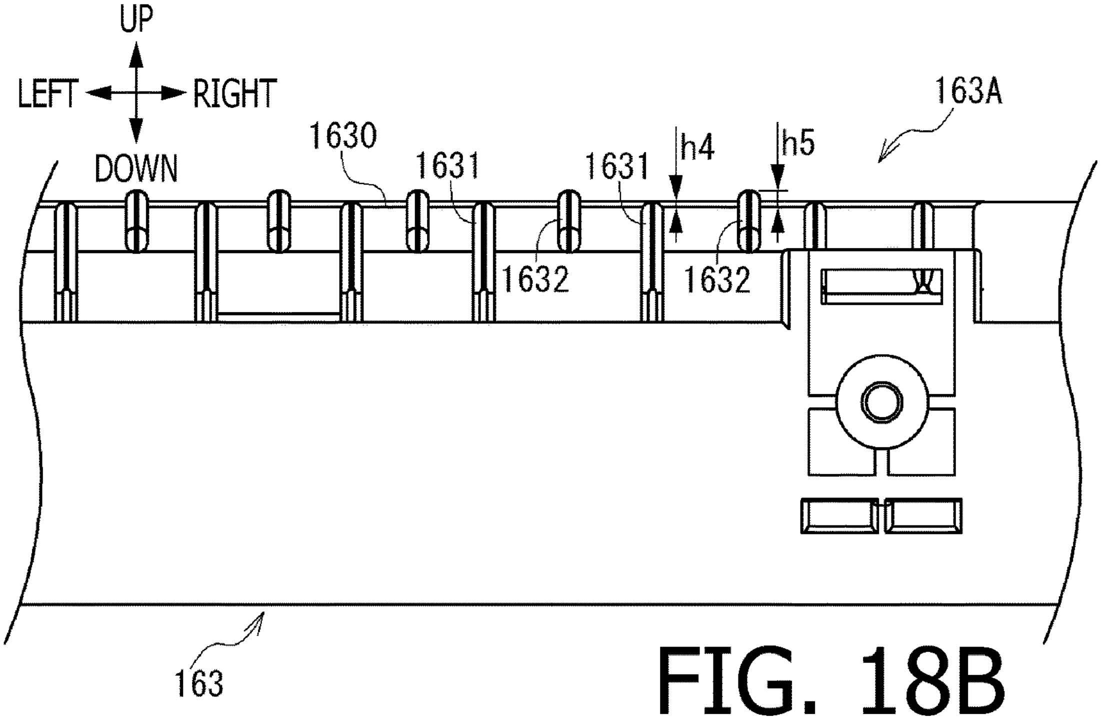
FIG. 18B is a front view of the modified lower frame.
Figure 19:
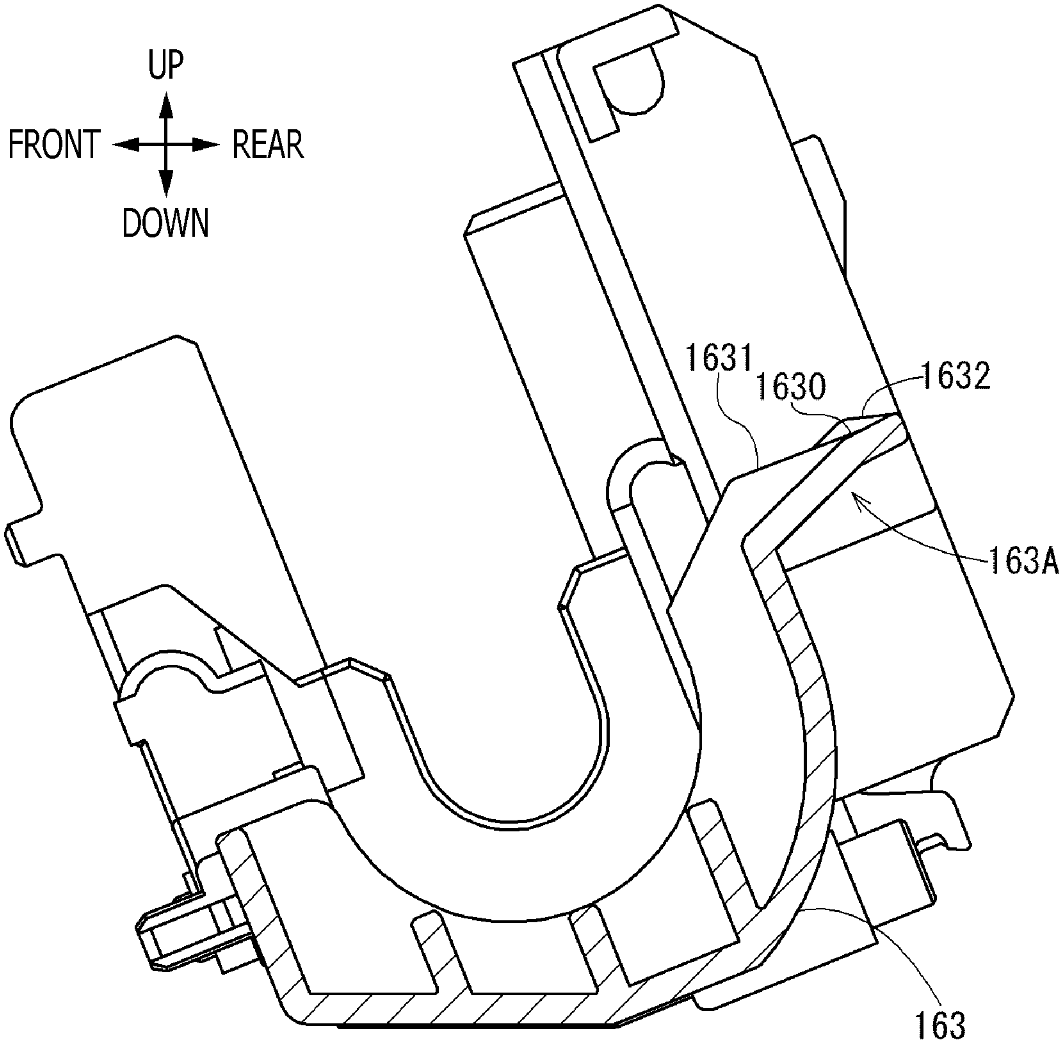
FIG. 19 is a side cross-sectional view of the modified lower frame.
Figure 20:
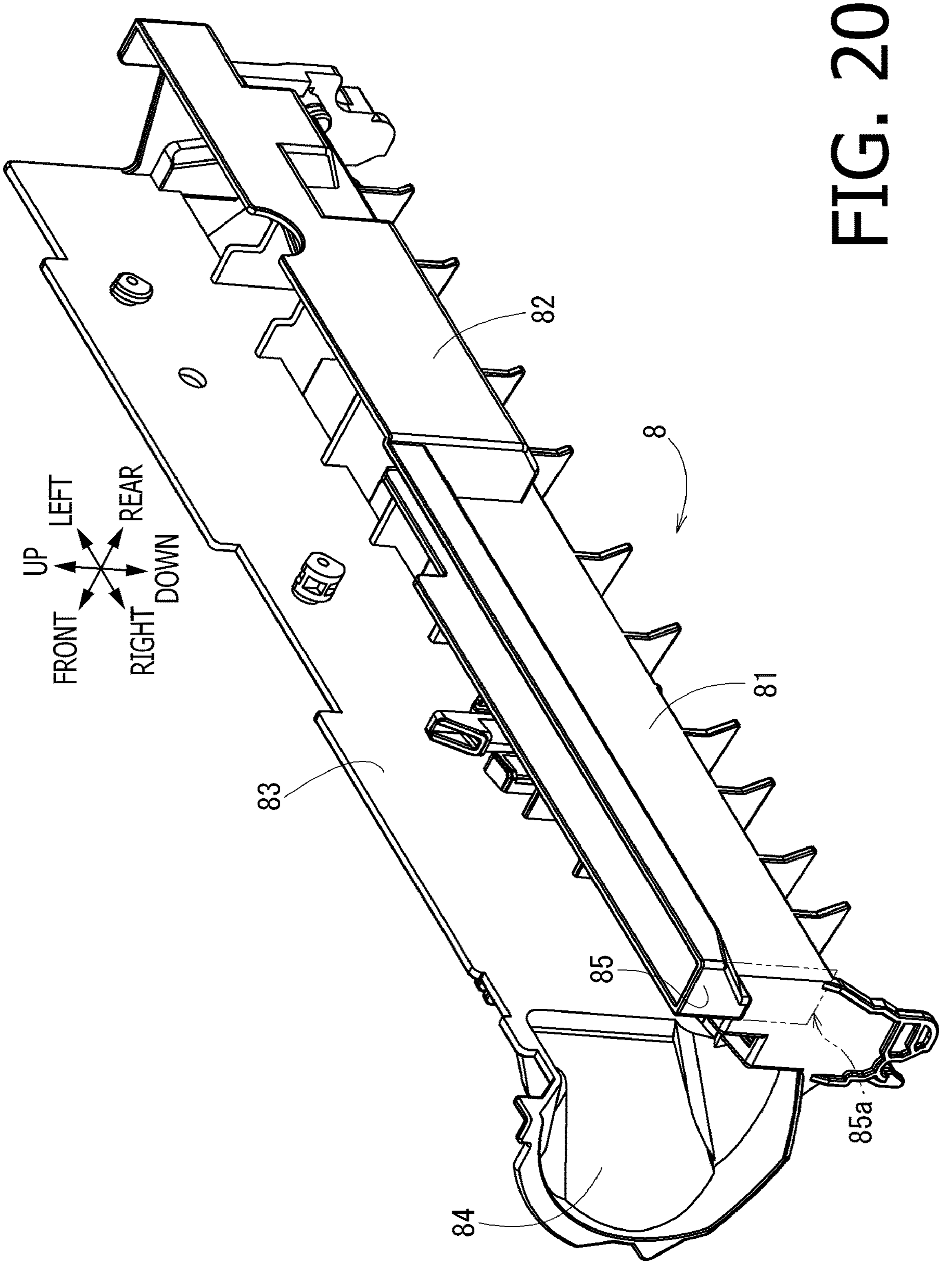
FIG. 20 is a perspective view of the air duct.
Figure 21:
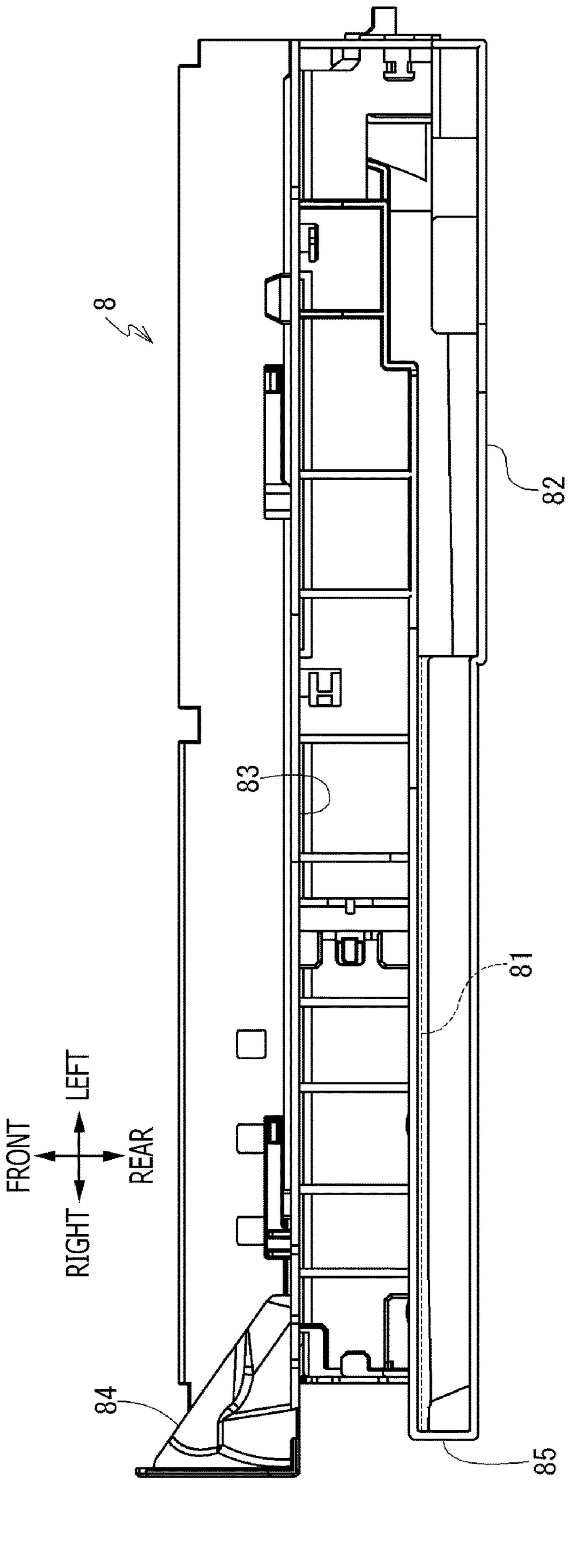
FIG. 21 is a plan view of the air duct.
Figure 22:
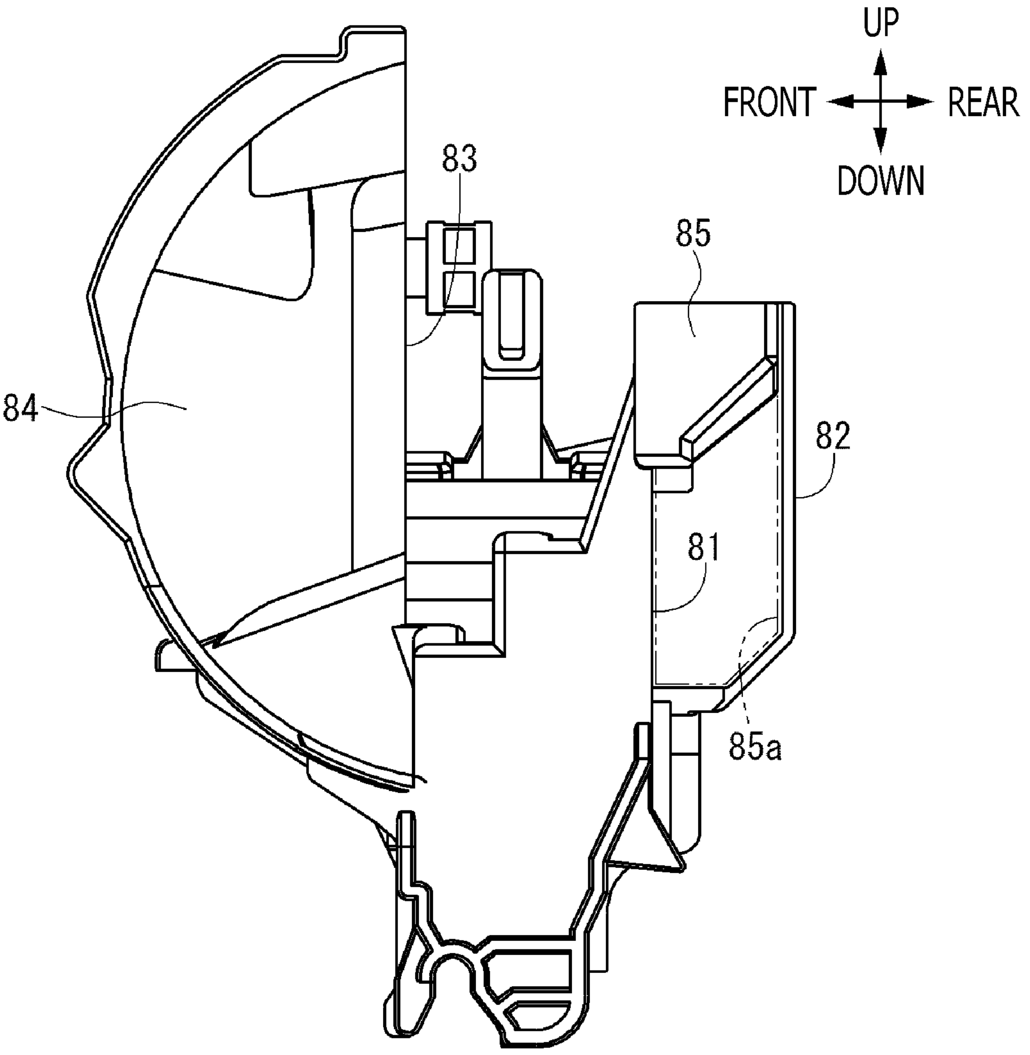
FIG. 22 is a side view of the air duct.

The lower sheet guide 63A of the lower frame 63 may also be configured like a lower sheet guide 163A of a lower frame 163 shown in FIGS. 17 to 19. The lower sheet guide 163A differs from the lower sheet guide 63A in that the lower sheet guide 163A includes lower guide surfaces 1630, lower first ribs 1631, and lower second ribs 1632 instead of the lower guide surfaces 630, the lower first ribs 631, and the lower second ribs 632.

The lower guide surfaces 1630, the lower first ribs 1631, and the lower second ribs 1632 are located downstream of the heating rotating member 61 and the pressing rotating member 62 in the sheet conveying direction. The lower guide surfaces 1630 are surfaces extending in the left-right direction and facing substantially up.

The lower first ribs 1631 project upward from the lower guide surfaces 1630 and extend in the sheet conveying direction. A plurality of lower first ribs 1631 are arranged in the left-right direction and guide the lower surface of the conveyed sheet S.

A downstream end of each lower first rib 1631 in the sheet conveying direction is at an intermediate portion of the lower guide surface 1630 in the sheet conveying direction. A projection height of the lower first ribs 1631 from the lower guide surfaces 1630 is h4.

Each lower second rib 1632 projects upward from the lower guide surface 1630 and extends in the sheet conveying direction. Each lower second rib 1632 is located between two lower first ribs 1631 in the left-right direction, and a plurality of lower second ribs 1632 are arranged in the left-right direction. The lower second ribs 1632 guide the lower surface of the conveyed sheet S.

A downstream end of each lower second rib 1632 in the sheet conveying direction is located at a downstream end of the lower guide surface 1630 in the sheet conveying direction. That is, the downstream ends of the lower first ribs 1631 are located upstream of the downstream ends of the lower second ribs 1632 in the sheet conveying direction.

Therefore, when the sheet S conveyed along the conveyance path P passes through the lower sheet guide 163A of the lower frame 163, the sheet S is guided by the lower first ribs 1631 and then guided by the lower second ribs 1632 adjacent to the lower first ribs 1631 in the left-right direction. As described above, in the lower frame 163, ribs for guiding the conveyed sheet S can be taken over from the lower first ribs 1631 to the lower second ribs 1632.

Accordingly, similarly to the case of the upper first ribs 641 and the upper second ribs 642 of the upper frame 64, it is possible to reduce the amount of moisture adhering to the sheet S from one lower first rib 1631 and the amount of moisture adhering to the sheet S from one lower second rib 1632.

Furthermore, a projection height of each lower second rib 1632 from the lower guide surface 1630 is h5, and the projection height h5 of the lower second rib 1632 is greater than the projection height h4 of the lower first rib 1631. That is, upper ends of the lower second ribs 1632 are higher than upper ends of the lower first rib 1631.

Therefore, when the lower second ribs 1632 take over the guiding of the conveyed sheet S, it is possible to effectively suppress the adhesion of the moisture accumulated on the lower guide surfaces 1630 of the lower frame 163 between the lower first ribs 1631 to the sheet S.

Furthermore, similarly to the lower second ribs 632, the lower second ribs 1632 are located at positions overlapping the upper first ribs 641 in the left-right direction. That is, the positions of the lower second ribs 1632 and the upper first ribs 641 in the left-right direction coincide with each other. Additionally, similarly to the case of the lower first ribs 631, each lower first rib 1631 is located between two upper first ribs 641 in the left-right direction.

Air Duct

As shown in FIGS. 5 to 7 and 20 to 22, the air duct 8 extends in the left-right direction. The air duct 8 includes a first wall 81 and a second wall 82 that are located in front of the fuser 6, that is, upstream of the fuser 6 in the sheet conveying direction, and face the fuser 6 with a gap therebetween.

The first wall 81 and the second wall 82 face in the front-rear direction, and the first wall 81 is located on the right side of the second wall 82. The first wall 81 faces the right half of the fuser 6, and the second wall 82 faces the left half of the fuser 6.

The second wall 82 is located closer to the fuser 6 than the first wall 81 in the sheet conveying direction. The second wall 82 is adjacent to the fuser in the sheet conveying direction, and there is a clearance G1 between the first wall 81 and the fuser 6 in the sheet conveying direction. The clearance G1 is covered from above by the static electricity remover 65 attached to the upper surface of the upper frame 64.

The air duct 8 includes a third wall 83 located in front of the first wall 81 and the second wall 82. The third wall 83 faces the first wall 81 and the second wall 82 across a gap in the sheet conveying direction, and there is a clearance G2 between the third wall 83 and the first and second walls 81 and 82.

The fan 25 is located on the right side of the air duct 8. The air duct 8 includes an exhaust guide 84 located between right ends of the first and third walls 81 and 83 and the fan 25. The exhaust guide 84 is integrally connected to a right end portion of the third wall 83, and guides air flowing through the clearance G2 between the first and second walls 81 and 82 and the third wall 83 to the fan 25 (see an air flow F1 shown in FIG. 6).

The air duct 8 includes a side frame 85 that projects from a right end portion of the first wall 81 toward the rear side, that is, toward the downstream side in the sheet conveying direction. The side frame 85 is located between the first wall 81 and the fuser 6 at a right end portion of the air duct 8. The side frame 85 includes an opening 85*a* that is open in the left-right direction.

Airflow formed by the fan 25 can easily flow through the clearance G1 between the first wall 81 and the fuser 6. On the other hand, since the second wall 82 is adjacent to the fuser 6, it is difficult for the airflow formed by the fan 25 to flow through between the second wall 82 and the fuser 6.

Figure 6:
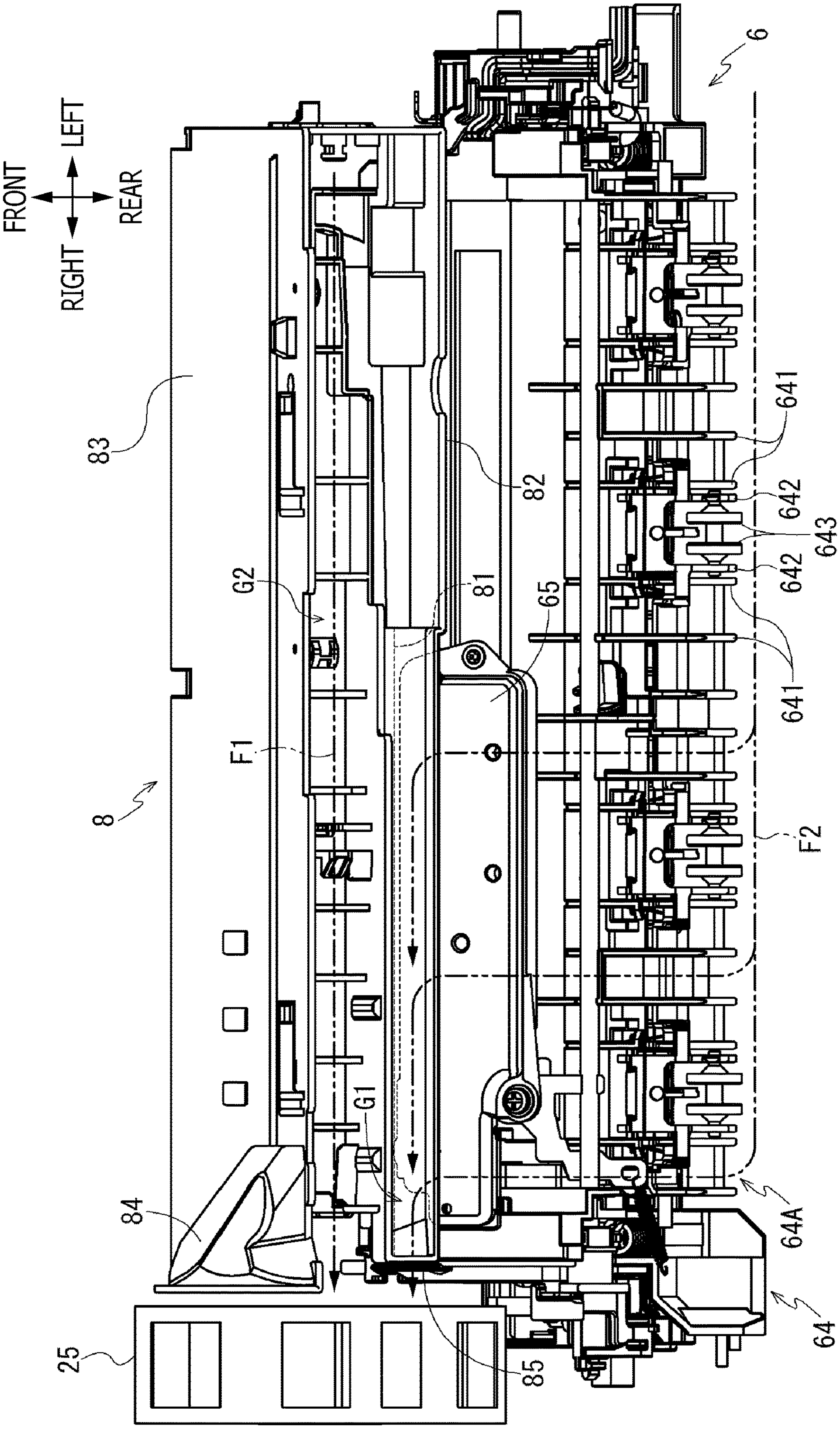
FIG. 6 is a plan view of the fuser and the air duct.
Figure 7:
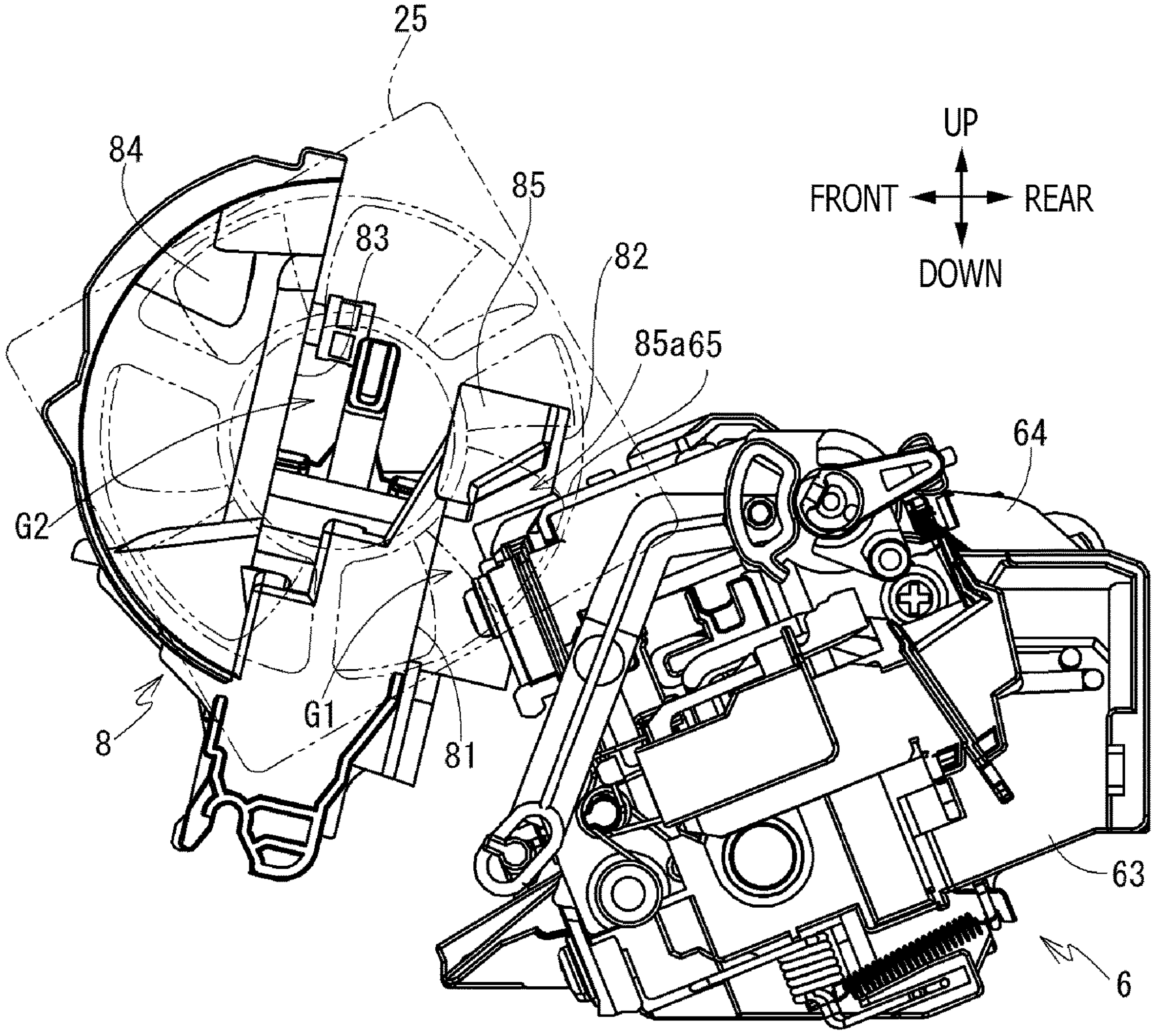
FIG. 7 is a side view of the fuser and the air duct.
Figure 8:
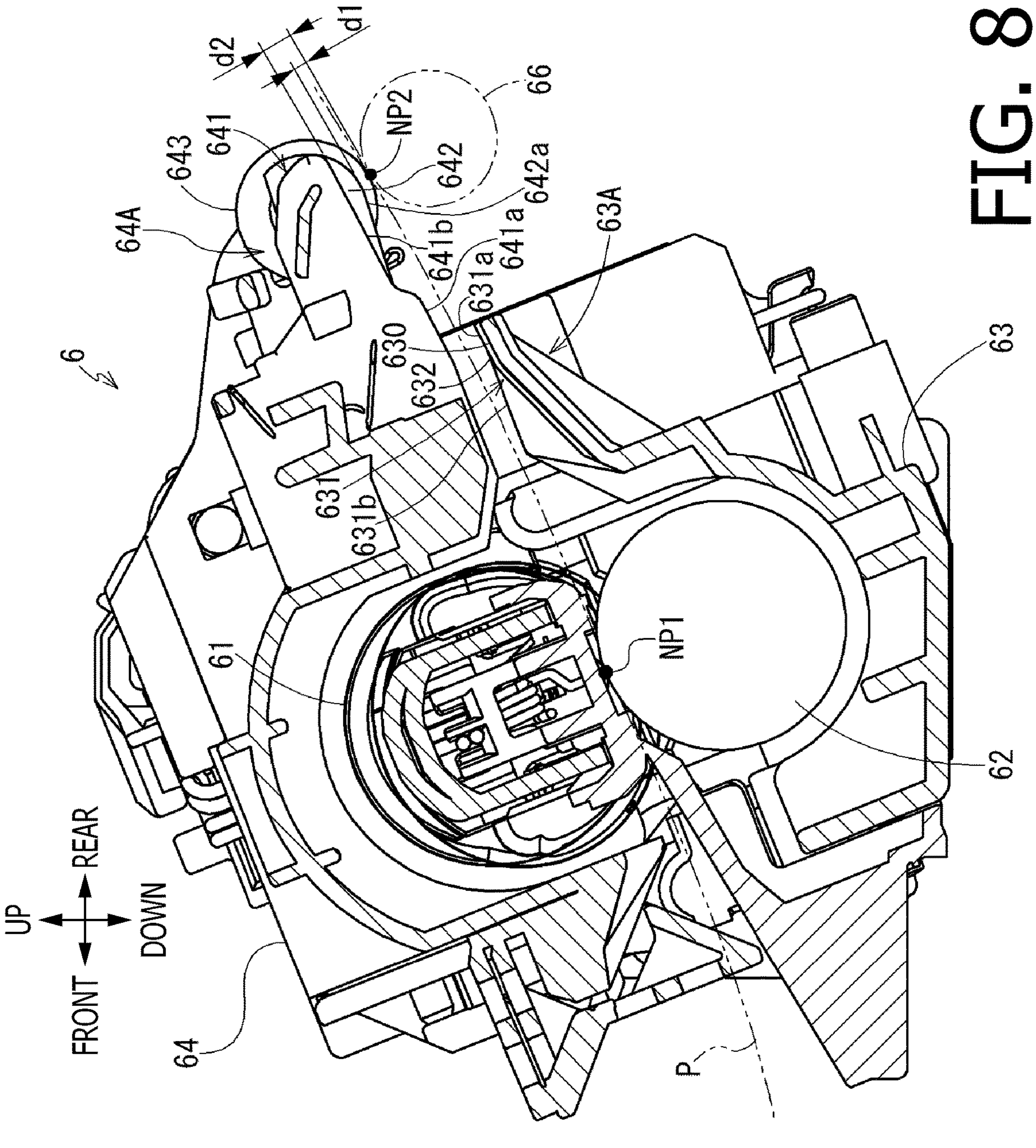
FIG. 8 is a side cross-sectional view of the fuser.

Therefore, in the image forming apparatus 1, an airflow causing air on the left side of the fuser 6 to flow between the second wall 82 and the fuser toward the fan 25 is less likely to occur, and thus the air on the left side of the fuser 6 flows rightward on the rear side of the fuser 6, then goes around the fuser 6 from the rear side to the front side, and flows into the fan 25 through the clearance G1 between the first wall 81 and the fuser 6 (see air flows F2 shown in FIG. 6).

That is, on the front side of the fuser 6, the airflow generated by the fan 25 can be suppressed from flowing from the left side to the right side of the fuser 6 by the second wall 82, and on the rear side of the fuser 6, the airflow generated by the fan 25 can be promoted to flow from the left side to the right side of the fuser 6 by the first wall 81.

Accordingly, it is possible to increase a flow amount of the air flowing, by the fan 25, adjacent to the lower sheet guide 63A of the lower frame 63 and the upper sheet guide 64A of the upper frame 64 located at the rear end portion of the fuser 6, and thus it is possible to promote drying of the moisture adhered to the lower sheet guide 63A and the upper sheet guide 64A.

In this case, since the clearance G1 between the first wall 81 and the fuser 6 is covered with the static electricity remover 65 from above, air on the left side of the fuser 6 can be suppressed from flowing around the front side of the fuser 6 to the clearance G1 by the static electricity remover 65. Therefore, it is possible to further increase the flow amount of air flowing on the rear side of the fuser 6.

Since the side frame 85 formed at the right end portion of the first wall 81 has the opening 85*a* that is open in the left-right direction, the air flowing through the clearance G1 easily flows toward the fan 25, and thus it is possible to further increase the flow amount of air flowing on the rear side of the fuser 6.

The first wall 81 and the second wall 82 for promoting the airflow of air flowing on the rear side of the fuser 6 are provided to the air duct 8, that is, the air duct 8 also serves as a wall member constituting the first wall 81 and the second wall 82. Therefore, the number of components can be reduced.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

The rollers 643 are examples of a first conveying roller, and the driving rollers 66 are examples of a second conveying roller. The left side of the fuser 6 is an example of the other side of the fuser in the width direction, and the right side of the fuser 6 is an example of one side of the fuser in the width direction.

What is claimed is:

1. An image forming apparatus, comprising:

a photosensitive drum on which a toner image is to be formed; and a fuser configured to fix the toner image transferred from the photosensitive drum onto a conveyed sheet, the fuser including:

a heating rotating member;

a pressing rotating member configured to nip the sheet together with the heating rotating member; and an upper frame covering the heating rotating member, wherein the upper frame includes:

an upper first rib extending in the sheet conveying direction downstream of the heating rotating member in the sheet conveying direction;

an upper second rib adjacent to the upper first rib in a width direction perpendicular to the sheet conveying direction and extending in the sheet conveying direction;

a first conveying roller configured to convey the sheet; and a second conveying roller configured to face the first conveying roller, the first conveying roller and the second conveying roller configured to nip the sheet at a nip point therebetween, wherein the upper first rib includes:

a first guide surface configured to guide an upper surface of the conveyed sheet; and a separation surface located downstream of the first guide surface in the sheet conveying direction and at a position farther from the nip point than the first guide surface in a direction perpendicular to the sheet conveying direction and the width direction, wherein the upper second rib includes a second guide surface configured to guide the upper surface of the conveyed sheet, wherein the second guide surface is located downstream of the first guide surface in the sheet conveying direction, and wherein a distance between the nip point and the second guide surface in the direction perpendicular to the sheet conveying direction and the width direction is smaller than a distance between the nip point and the separation surface, and wherein the fuser further include s a lower frame include:

a pair of lower first ribs extending in the sheet conveying direction downstream of the heating rotating member in the sheet conveying direction and being arranged in the width direction, the pair of lower first ribs being configured to guide a lower surface of the conveyed sheet; and a lower second rib located between the lower first ribs in the width direction and having a length in the sheet conveying direction shorter than a length in the sheet conveying direction of the lower first ribs, wherein the second rib overlaps with a downstream end portion of the lower first ribs in the conveying direction.

2. The image forming apparatus according to claim 1, wherein the upper second rib supports the first conveying roller.

3. The image forming apparatus according to claim 1, wherein:

the lower first rib has a first portion being a downstream end portion thereof and a second portion extending from the first portion to the upstream side in the sheet conveying direction, an upper end of the first portion and an upper end of the lower second rib are at the same height, and an upper end of the second portion is above an upper end of the first portion.

4. The image forming apparatus according to claim 1, wherein, in the sheet conveying direction, a downstream end of the lower first rib is upstream of a downstream end of the lower second rib.

5. The image forming apparatus according to claim 4, wherein the upper end of the lower second rib is above an upper end of the lower first rib.

6. The image forming apparatus according to claim 1, wherein the upper end of the lower first rib is formed in an arcuate shape when viewed in the sheet conveying direction.

7. The image forming apparatus according to claim 1, wherein the lower second rib overlaps with the upper first rib in the width direction.

8. The image forming apparatus according to claim 1, wherein the lower first rib is located between two upper first ribs in the width direction.

9. The image forming apparatus according to claim 1, further including:

a fan located upstream of the fuser in the sheet conveying direction and on one side in the width direction with respect to the fuser;

a first wall located upstream of the fuser in the sheet conveying direction with a clearance between the fuser; and a second wall located upstream of the fuser in the sheet conveying direction and closer to the fuser than the first wall, and located on the other side in the width direction with respect to the first wall.

10. The image forming apparatus according to claim 9, further comprising a static eliminator supported by said upper frame, wherein the static eliminator covers a clearance between the first wall and the fuser from above.

11. The image forming apparatus according to claim 9, further comprising a side frame located between one end portion of the fuser on the one side in the width direction and one end portion of the first wall on the one side in the width direction and having an opening that is open in the width direction.

12. The image forming apparatus according to claim 9, further comprising an air duct configured to guide air toward the fan, wherein the air duct includes the first wall and the second wall.

* * * * *